US008896627B2

(12) United States Patent
Morohoshi et al.

(10) Patent No.: US 8,896,627 B2
(45) Date of Patent: Nov. 25, 2014

(54) INFORMATION DISPLAY DEVICE, INFORMATION DISPLAY SYSTEM, AND COMPUTER PROGRAM PRODUCT

(75) Inventors: Hiroshi Morohoshi, Kanagawa (JP); Yoshiaki Nishizaki, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 577 days.

(21) Appl. No.: 13/226,886

(22) Filed: Sep. 7, 2011

(65) Prior Publication Data

US 2012/0062590 A1    Mar. 15, 2012

(30) Foreign Application Priority Data

Sep. 15, 2010  (JP) ................................. 2010-207318

(51) Int. Cl.
*G09G 5/00*     (2006.01)
*G06T 11/20*    (2006.01)
*G06F 17/30*    (2006.01)

(52) U.S. Cl.
CPC ............................... *G06F 17/30265* (2013.01)
USPC .......................................... 345/629; 345/440

(58) Field of Classification Search
None
See application file for complete search history.

(56) References Cited

U.S. PATENT DOCUMENTS

| | | | | |
|---|---|---|---|---|
| 6,437,797 | B1 * | 8/2002 | Ota | 345/638 |
| 6,882,350 | B2 * | 4/2005 | Asami | 345/638 |
| 6,967,666 | B1 * | 11/2005 | Koda | 345/638 |
| 7,116,325 | B2 * | 10/2006 | Asami | 345/419 |
| 7,158,151 | B2 * | 1/2007 | Asami | 345/629 |
| 7,454,061 | B2 | 11/2008 | Yanagisawa et al. | |
| 7,519,469 | B2 * | 4/2009 | de Silva et al. | 701/454 |
| 7,621,448 | B2 | 11/2009 | Sakurai et al. | |
| 7,800,615 | B2 * | 9/2010 | MacPherson | 345/440 |
| 7,925,716 | B2 * | 4/2011 | Zhang et al. | 709/218 |
| 8,169,505 | B2 * | 5/2012 | Hoshi | 348/231.3 |
| 2005/0076004 | A1 | 4/2005 | Yanagisawa et al. | |
| 2007/0217855 | A1 | 9/2007 | Morohoshi | |
| 2008/0045138 | A1 * | 2/2008 | Milic-Frayling et al. | 455/3.04 |
| 2008/0068347 | A1 | 3/2008 | Morohoshi | |
| 2008/0204317 | A1 * | 8/2008 | Schreve et al. | 342/357.13 |
| 2009/0177628 | A1 | 7/2009 | Yanagisawa et al. | |
| 2009/0214082 | A1 * | 8/2009 | Hoshi | 382/106 |
| 2009/0216435 | A1 * | 8/2009 | Zheng et al. | 701/209 |
| 2011/0205396 | A1 * | 8/2011 | Jin | 348/231.2 |

FOREIGN PATENT DOCUMENTS

| | | |
|---|---|---|
| JP | 11-175535 A | 7/1999 |
| JP | 2006-258441 | 9/2006 |
| JP | 2008-97175 A | 4/2008 |
| JP | 4313638 | 5/2009 |

OTHER PUBLICATIONS

Office Action issued Feb. 18, 2014, in Japanese Patent Application No. 2010-207318.

* cited by examiner

*Primary Examiner* — Ryan R Yang
(74) *Attorney, Agent, or Firm* — Oblon, Spivak, McClelland, Maier & Neustadt, L.L.P.

(57) ABSTRACT

An information display device of an embodiment includes: a storage unit that stores the image data in association with information of the image data; a retrieval condition receiving unit that receives an input of a retrieval condition; a retrieval unit that retrieves the image data from the storage unit according to the received retrieval condition; a display control unit that displays an entire image representing an entire range in which the retrieved image data is distributed on a client terminal; and an operation receiving unit that receives an operation of an input unit by a user on a screen on which the entire image is displayed. The display control unit extracts the image data included in a range represented by a locus formed by an operation of the input unit, and displays the extracted image data on the client terminal together with the entire image.

8 Claims, 20 Drawing Sheets

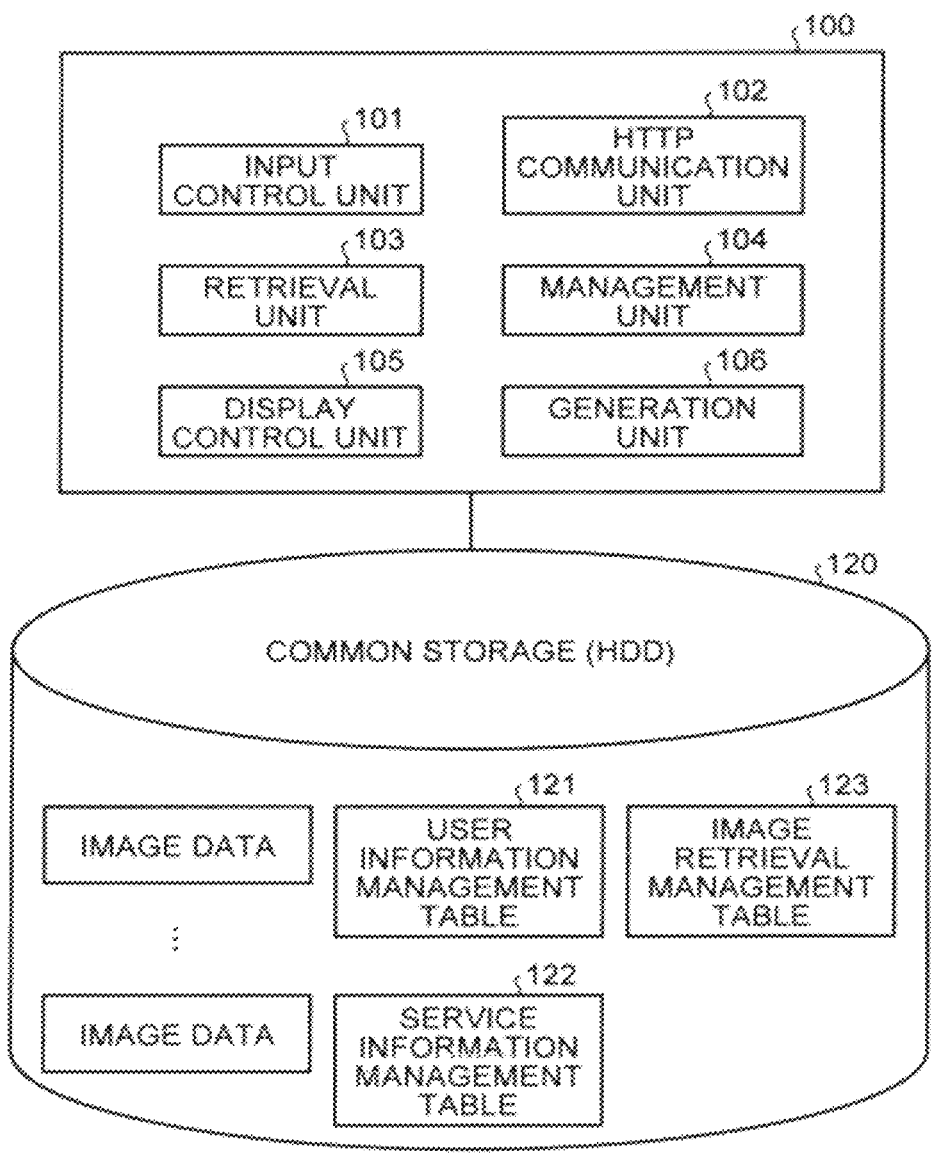

FIG.3

USER INFORMATION MANAGEMENT TABLE 121

| USER ID (MEMBERSHIP ID) | SERVICE INFORMATION | MODEL INFORMATION | USER INFORMATION | USE INFORMATION | HISTORY INFORMATION | ... |
|---|---|---|---|---|---|---|
| AAA001 | PLAN A | MOBILE A PC_XX | ·45 YEARS OLD ·MALE COMPANY EMPLOYEE | IMAGE 30% TEXT 10% | 201001XX | ... |
| AAA002 | PLAN A | MOBILE B MOBILE C | 25 YEARS OLD FEMALE OL | IMAGE 50% TEXT 20% | 201001XX | ... |
| : | : | : | : | : | : | : |
| ZZZ001 | PLAN B | PC_AA | 20 YEARS OLD MALE STUDENT | IMAGE 70% TEXT 30% | 200912XX | ... |
| : | : | : | : | : | : | : |

FIG.4

SERVICE INFORMATION MANAGEMENT TABLE 122

| SERVICE INFORMATION ID | SERVICE NAME | IMAGE TYPE | | | TARGET | ... |
|---|---|---|---|---|---|---|
| PLAN A | IMAGE RETRIEVAL | MOVING PICTURE | PHOTOGRAPH | POWERPOINT | KANTO | ... |
| PLAN B | INFORMATION PROVISION | MOVING PICTURE | STORE MENU | MENU | KANTO | ... |
| : | : | : | : | : | : | : |

FIG.5

IMAGE RETRIEVAL MANAGEMENT TABLE
(PLAN A: INDIVIDUAL USER) 123

| IMAGE ID | IMAGE NAME | FOLDER | CATEGORY | SIZE | REGISTRATION DATE | GPS INFORMATION |
|---|---|---|---|---|---|---|
| 001 | ABC | AAA | LANDSCAPE | 10 KB | YYMMDD | ... |
| 002 | XYZ | BBB | HOBBY· VEHICLE | 10 KB | YYMMDD | ... |
| : | : | : | : | : | : | : |

INFORMATION DISPLAY DEVICE, INFORMATION DISPLAY SYSTEM, AND COMPUTER PROGRAM PRODUCT

CROSS-REFERENCE TO RELATED APPLICATIONS

The present application claims priority to and incorporates by reference the entire contents of Japanese Patent Application No. 2010-207318 filed in Japan on Sep. 15, 2010.

BACKGROUND OF THE INVENTION

1. Field of the Invention

The present invention relates to an information display device, an information display system, and computer program product for information display.

2. Description of the Related Art

Conventionally, basic software, necessarily included in an operating system (OS) of a personal computer (PC) serving as an information display device, has a retrieval function; and when the function is activated, an input area for inputting an input condition for the retrieval or the like is displayed on a display screen of the PC. When a user inputs a predetermined keyword through the input area, the keyword is compared with a file name or a keyword stored in the PC by the retrieval function; and a retrieval result is displayed on the screen of the PC in a list form such as a list.

On the screen of the retrieval result, a view of a list form is typically displayed as the retrieval result. As a display form, there may be used various forms such as display starting from a file name, display starting from a file size, or display of file storage information.

For example, disclosed is a technique of performing the retrieval by narrowing down a retrieval target to one or more according to an input retrieval condition so as to display a retrieval result on a screen (for example, Japanese Patent Application Laid-open No. 2006-258441).

However, the technique disclosed in Japanese Patent Application Laid-open No. 2006-258441 or the retrieval function of the basic software necessarily included in the OS of the PC deals with, for example, installed basic file formats, forms, or names. For this reason, since it is difficult to variably display the retrieval result according to the input retrieval condition and the user's operation, there has been a problem in view of visibility.

Further, in order to obtain a desired retrieval result, the user needs perform the retrieval many times while changing the retrieval conditions and check display of the updated retrieval result at each time; and thus operability and efficiency of the retrieval work have been poor. In addition, since the user is difficult to survey the amount of data or the distribution of data of an entire category to which a retrieval target image belongs, the user is difficult to grasp which portion of the entire category has to be retrieved and to what extent the retrieval has to be performed, and thus efficiency of the retrieval work has been poor.

SUMMARY OF THE INVENTION

It is an object of the present invention to at least partially solve the problems in the conventional technology.

According to an aspect of the present invention, there is provided an information display device that manages and displays image data on a client terminal connected through a network, including: a storage unit that stores the image data therein in association with information of the image data; a retrieval condition receiving unit that receives an input of a retrieval condition; a retrieval unit that retrieves the image data from the storage unit according to the received retrieval condition; a display control unit that displays an entire image representing an entire range in which the retrieved image data is distributed according to the information of the image data on the client terminal; and an operation receiving unit that receives an operation of an input unit by a user on a screen on which the entire image is displayed. The display control unit extracts the image data included in a range represented by a locus formed by an operation of the input unit from among a retrieval result by the retrieval unit, and displays the extracted image data on the client terminal together with the entire image.

According to another aspect of the present invention, there is provided an information display system, including: a client terminal; and an information display device that manages and displays image data on the client terminal. The information display device includes a storage unit that stores the image data therein in association with information of the image data, a retrieval condition receiving unit that receives an input of a retrieval condition, a retrieval unit that retrieves the image data from the storage unit according to the received retrieval condition, a display control unit that transmits an entire image, representing an entire range in which the retrieved image data is distributed according to the information of the image data to be displayed on the client terminal, to the client terminal, and an operation receiving unit that receives an operation of an input unit of the client terminal by a user on a screen on which the entire image is displayed. The display control unit extracts the image data included in a range represented by a locus that is formed by an operation of the input unit from among a retrieval result by the retrieval unit, transmits the extracted image data to the client terminal, and make the extracted image data display on the client terminal together with the entire image. The client terminal includes a communication unit that transmits the retrieval condition to the information display device and receives the entire image and the extracted image data from the information display device and display unit that displays the extracted image data together with the entire image.

According to another aspect of the present invention, there is provided a computer program product including a non-transitory computer-usable medium having computer-readable program codes embodied in the medium for displaying image data on a client terminal, the program codes when executed causing a computer to execute: storing an image data in a storing unit in association with information of the image data; first receiving that includes receiving an input of a retrieval condition; retrieving the image data from the storage unit according to the received retrieval condition; displaying an entire image representing an entire range in which the retrieved image data is distributed according to the information of the image data on the client terminal; and second receiving that includes receiving an operation of an input unit by a user on a screen on which the entire image is displayed. The displaying of the entire image includes extracting the image data included in a range represented by a locus formed by an operation of the input unit from among a retrieval result by the retrieval unit and displaying the extracted image data on a client terminal together with the entire image.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a block diagram illustrating a functional configuration of a file server according to the present embodiment;

FIG. 3 is a diagram illustrating an example of a user information management table;

FIG. 4 is a diagram illustrating an example of a service information management table;

FIG. 5 is a diagram illustrating an example of an image retrieval management table;

DETAILED DESCRIPTION OF THE PREFERRED EMBODIMENTS

Hereinafter, exemplary embodiments of an information display device, an information display system, and a computer program product according to the present invention will be described with reference to the accompanying drawings.

Figure 1:
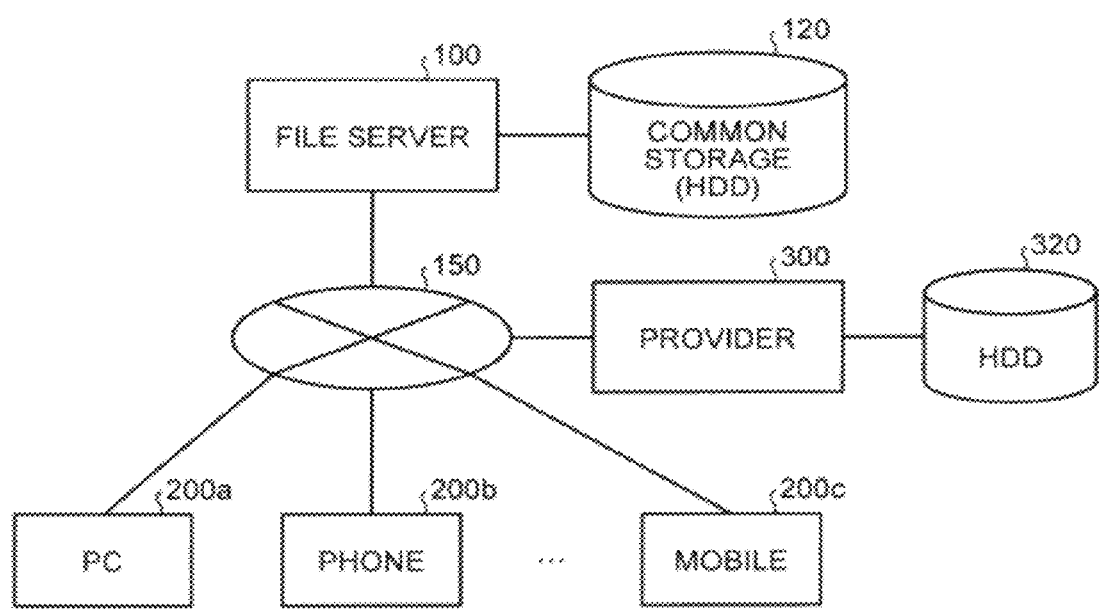
FIG. 1 is an overall view illustrating a network configuration of an information display system according to the present embodiment.

FIG. 1 is an overall view illustrating a network configuration of an information display system according to the present embodiment. As illustrated in FIG. 1, the information display system includes a file server 100 as an information display device; a provider's web server (hereinafter, referred to as "provider") 300; and a client terminal such as a PC 200a, a portable telephone (hereinafter, referred to as "phone") 200b, and a portable information terminal (hereinafter, referred to as "mobile") 200c, which are connected to a network 150 such as the Internet. A client terminal 200 is not limited to the above mentioned devices but may include any device capable of inputting and outputting data such as an electronic book. Hereinafter, unless set forth otherwise, the PC 200a, the phone 200b, and the mobile 200c are referred to collectively as the client 200.

The file server 100 includes a common storage 120 which is a storage medium such as a hard disk drive (HDD) device. The common storage 120 is common-accessible from a plurality of PCs 200a and stores image data received from the PC 200a through the file server 100. The file server 100 manages image data stored in the common storage 120 and controls display on the client 200.

The client 200 includes a storage medium such as a hard disk drive (HDD) device (hereinafter, referred to as "HDD"). In this HDD, stored are image data to be uploaded to the common storage 120 of the file server 100 and image data downloaded from the common storage 120. Further, when the user displays image data stored in the common storage 120 through the client 200, image data of a display target is downloaded from the common storage 120 through the provider 300 and then temporarily stored in the HDD.

The provider 300 includes a hard disk drive (HDD) device 320 and relays information between the file server 100 and the client 200 through the network 150. The HDD device 320 temporarily stores image data of an update target received from the client 200, image data which is a download target from the file server 100 to the client 200, and the like.

FIG. 2 is a block diagram illustrating a functional configuration of the file server 100 according to the present embodiment. The file server 100 includes an input control unit 101, a hypertext transfer protocol (HTTP) communication unit 102, a retrieval unit 103, a management unit 104, a display control unit 105, a generating unit 106, and the common storage (HDD) 120 as illustrated in FIG. 2.

The HTTP communication unit 102 controls HTTP-protocol based communication with the client 200 through the provider 300. The management unit 104 controls, for example, editing and deletion of a plurality of image data stored in the common storage 120 or controls, for example, generation, editing, and deletion of a gallery which is a classification of image data. Further, when logon information is input from the client 200, the management unit 104 receives logon and performs a user authentication process with reference to a user management database (not shown).

As illustrated in FIG. 2, the common storage 120 stores a plurality of image data, a user information management table 121, a service information management table 122, and an image retrieval management table 123.

A plurality of image data is stored in the common storage 120 through the network 150 from the client 200 by the user and managed according to each user.

A plurality of image data is classified for each user and stored as a gallery image. The gallery image is an image displayed on the client 200 which is a target of an information display service provided by the file server 100 and generated by the management unit 104 according to the user's instruction from the PC 200a. In the present embodiment, using a landscape image as a gallery image, another appropriate example is explained.

The user information management table 121 is a table that stores user information accumulated in a database of the file server 100. FIG. 3 is a diagram illustrating an example of the user information management table 121. As illustrated in FIG. 3, a user ID (membership ID) for identifying a registered user is stored in association with service information for identifying a type of service which can be provided to the user, information regarding a device name or a device ID of a device used by the user or a device or a peripheral which becomes an input means included in a corresponding model, user information such as the user's age or occupation, use information representing contents (an image, a moving picture, a text, a voice, or the like) information of a used service, and history information representing use history of a service.

For example, a user identified by a user ID "AAA001" of FIG. 3 can use service information "plan A," model information is "portable A, PC_XX," user information is "45 years old, male company employee," use information is "image 30%, text 10%," and history information is "201001XX."

The service information management table 122 is a table that stores information of a service which can be used by a registered user. FIG. 4 is a diagram illustrating an example of the service information management table 122. As illustrated in FIG. 4, the service information management table 122 stores a service information ID for identifying a service in association with a service name, an image type (a type of an image, a photograph, a PowerPoint©, or the like), a target region where a service can be used, and the like.

For example, a service information ID "plan A" of FIG. 4 is associated with a service name "image retrieval," an image type "image, photograph, PowerPoint©," and a target "Kanto."

For example, when a service A is a "store image providing service," all images included in a target region based on global positioning system (GPS) information representing the user's positional information and a retrieval condition input by the user become a retrieval target; and retrieval results are sequentially displayed in response to the user's operation. Further, when a service B is a "menu providing service," menu images of food or the like in all stores included in a target region based on GPS information representing the user's positional information and a retrieval condition input by the user becomes a retrieval target; and retrieval results are sequentially displayed in response to the user's operation.

The image retrieval management table 123 is a table that stores image data and information of image data. FIG. 5 is a diagram illustrating an example of the image retrieval management table 123. As illustrated in FIG. 5, the image retrieval management table 123 stores an image ID for identifying image data provided by a service in association with information of image data. The information of image data includes items such as an image name, a folder which is an image storage location, an image category (a landscape image, a hobby, etc.), an image size (the capacity, the size, the magnitude, a time, etc.), date and time in which an image is registered, GPS information representing the position at which an image is acquired, and the like. The image retrieval management table 123 manages an image icon or a thumbnail which is contracted and displayed on a screen in association with image data.

For example, an image ID "001" of FIG. 5 is associated with an image name "ABC," a folder "AAA," a category "landscape," a size "10 KB," and a registration date "YYM-MDD."

As a providing method, according to positional information discriminated by GPS information and the user's mouse operation state, images within a several-kilometer radius from the position of the client 200 used by the user among all retrieval results are provided inclusively or sequentially according to a moving direction or speed.

The input control unit 101 has a function as a retrieval condition receiving unit that receives an input of a retrieval condition from the user, a function as an operation receiving unit that receives the user's operation by an input means on the screen on which an entire image of retrieved image data is displayed, and the like. The input control unit 101 receives various inputs to the client 200 by the user through the HTTP communication unit 102.

The entire image of image data refers to an image representing an entire range in which retrieved image data is distributed according to information of image data. For example, when retrieved image data is distributed according to coordinates of the world map as information of image data, the world map is an entire image of image data. As the entire image of image data, there may be used a category to which image data stored in the image retrieval management table 123 belongs. However, the entire image of image data is not limited thereto and may include any item in which retrieved image data can be distributed.

Further, if the client 200 is the PC200a, the input means is a peripheral device included in a typical PC such as a keyboard or a mouse that are connected to the PC 200a. Further, if the client 200 is the phone 200b or the mobile 200c, an operation from an alphanumeric button included in each device, a button displayed on a display panel of a body, a finger, or a pen is the input means.

For example, the input control unit 101 receives an input of a retrieval key "blue sea" as a retrieval condition. Here, the input retrieval key is an arbitrary word representing a picture of an image which the user desires to see. The input control unit 101 receives a keyword in a text form in a predetermined input area, for example, when a key of a keyboard is pressed down.

Further, when various sensors are disposed in the body, the input control unit 101 receives an operation input corresponding to features of various sensors. For example, when a camera is mounted in the body of the client 200, the input control unit 101 analyzes the user's operation such as swing of a finger or a hand captured by the camera through an image discrimination means (not shown) and inputs an analyzed result. In the present embodiment, the input means is described by using a mouse but is not limited thereto. The input means may include any input means to the extent that the screen can be operated in the above described manner.

The retrieval unit 103 retrieves image data from the common storage 120 according to the retrieval condition received from the input control unit 101. For example, when the input control unit 101 receives an input of GPS information as the retrieval condition, the retrieval unit 103 retrieves and acquires image data including GPS information from the common storage 120 as information of image data.

The retrieval unit 103 may retrieve image data based on the retrieval condition and the user information registered in the user information management table 121. For example, when a word representing store information is input as a retrieval key, the retrieval unit 103 may perform the retrieval by further narrowing down the retrieval condition based on the user's sex or age, or the like.

The generating unit 106 specifies an item in which retrieved image data can be displayed in a distributed form according to the retrieval result and generates an axis for distributing image data based on the specified item. The generating unit 106 generates, for example, two axes according to information of all retrieved image data such as a number, a degree of similarity of each image data, or the like. For example, when image data is distributed based on an item representing a shooting date of image data, the generating unit 106 acquires shooting dates of all image data and generates an axis having a predetermined date interval according to a time period from an oldest shooting date to a latest shooting date. An item for generating an axis may be decided based on image information by the generating unit 106 or may be arbitrarily designated by the user.

The number of axes generated by the generating unit 106 may be two or more. In the case of generating two or more axes, the generating unit 106 decides discriminable candidates of three axes by sequentially executing the above process three times and plots image data according to a value of each axis.

First, a description will be made in connection with a method of deciding an item for generating an axis based on image information through the generating unit 106. For example, when 100 pieces of image data are retrieved from a keyword "blue sea" through the retrieval unit 103, the generating unit 106 generates an axis based on a shooting timing included in image information of 100 pieces of image data, a degree of similarity, or the like.

Here, whether or not an axis can be generated based on an item of shooting timing may be judged by the generating unit 106 discriminating whether or not image data can be distributed based on a predetermined number and a time period between_latest shooting timing and oldest shooting timing. For example, when shooting timings of all image data related to "blue sea," that is, the time period between oldest shooting timing and latest shooting timing is less than 6 months, the generating unit 106 determines that it is difficult to distribute all image data to be appropriately selectable and thus does not decide an item of shooting timing as an axis.

Meanwhile, when the time period between oldest shooting timing and latest shooting timing is 6 months or more, the generating unit 106 judges that an appropriate distribution can be made based on an item of the shooting timing and thus employs an item of shooting timing as an axis. The time period depends on image information of image data as the retrieval target. For example, even though the time period is 6 months, image data representing a child's growth record or an observation record on a plant can be appropriately distributed. A correspondence relation between the time period of shooting timing and image information may be registered in the common storage 120 in advance.

Further, in the case of generating an axis based on an item of GPS information, the generating unit 106 discriminates a predetermined number and positional information representing GPS information, and discriminates whether or not each image data can be distributed and plotted in a north-south direction or in an east-west direction.

For example, when there are many blue seas captured at the North Pole among all retrieved image data, image data based on the GPS information is inclined to the "North." For this reason, the generating unit 106 judges that an item of GPS information is not appropriate as an axis. In contrast, when there are many blue seas captured at the South Pole, image data based on the GPS information is inclined to the "South." Even in this case, the generating unit 106 judges that an item of GPS information is not appropriate as an axis.

In the case of generating an axis based on an item of the image capacity or the number of pixels, the generating unit 106 discriminates the image capacity or the number of pixels from a predetermined number and judges whether or not the distribution can be made based on the size thereof using a predetermined threshold value. The generating unit 106 decides the item of the image capacity or the number of pixels as an axis when the relatively equal distribution can be made based on the image capacity or the number of pixels.

As described above, the generating unit 106 decides a candidate of an axis effective for the distribution based on the number of image data of the retrieval result and information of image data. For example, when the user selects shooting timing (date and time) and the image capacity as a candidate of an axis, the display control unit 105 specifies a display area of image data based on coordinates (X-Y coordinates) of the display area of the screen displayed on the operation display unit of the client 200.

The generating unit 106 plots a thumbnail of image data or an image icon on the specified display area on an axis using shooting date and time as an X axis and the image capacity as a Y axis. Similarly, in the case of GPS information, the generating unit 106 plots a thumbnail or an image icon of image data on a map based on information of the latitude and the longitude recorded as GPS information. When the retrieval result is "blue sea," this plotting process is repetitively performed until the number of image data related to "blue sea" becomes zero.

In another example, the generating unit 106 may select an axis in which a difference is clearly shown as a priority candidate; and then the display control unit 105 may sequentially display two axes which are a pair of a plurality of patterns to be switchable by the user's designation. In this case, the input control unit 101 can appropriately receive selection of an axis of interest from the user. Meanwhile, when selection of an axis is received of a predetermined number of times but an axis has not been yet decided, the generating unit 106 may narrow a range of an axis or change a threshold value of an axis.

Thus, by viewing the plotted distribution state of image data of "blue sea," the user can easily check which information of the keyword "blue sea" input is as the retrieval condition and how many image data has been hit. Further, since an item for generating an axis can be arbitrarily designated, the user can change the plotted distribution state of image data of "blue sea" and check the retrieval result through a different axis.

The display control unit 105 displays the entire image on the screen displayed on the operation display unit (not shown) of the client 200 (hereinafter, referred to as "screen") according to the axis generated by the generating unit 106. For example, when the axis generated by the generating unit 106 has been generated based on GPS information, the display control unit 105 displays image data including GPS information in association with the position represented on the axis. Further, when the axis generated by the generating unit 106 is shooting timing, the display control unit 105 displays image data including shooting date and time in association with the position represented by a date of the axis.

The display control unit 105 displays a retrieval icon, operated through a mouse by the user, for designating display of the retrieval result in the entire image. At this time, the display control unit 105 displays the retrieval icon which is reduced or enlarged in size according to the amount of image data retrieved by the retrieval unit 103. Further, the display control unit 105 transmits various images to be displayed on the client 200 through the HTTP communication unit 102.

The display control unit 105 displays an icon (hereinafter, referred to as "image icon") or a thumbnail, in which image data retrieved by the retrieval unit 103 is reduced in size, on the screen. Here, the input control unit 101 receives movement of the retrieval icon by the user's mouse operation from among image icons or thumbnails displayed on the screen.

The display control unit 105 extracts image data specified by the image icon or the thumbnail included in a moving range of the retrieval icon and displays the extracted image data. The moving range of the retrieval icon refers to a range including the locus of the retrieval icon moved by the mouse operation.

The display control unit 105 specifies the axial position associated with the axis from the moving range of the retrieval icon and extracts image data included in the specified axial position. For example, the axial position refers to a value representing the latitude and the longitude on the world map in the case of GPS information and refers to specific shooting timing in the case of shooting timing. Further, the moving range of the retrieval icon refers to a series of ranges in which a screen position pointed by the retrieval icon when the user presses the left click of the mouse down is a start point, and a screen position pointed by the retrieval icon when tracing of an arbitrary screen surface is finished and then the pressed-down left click is released is an end point.

Specifically, the input control unit 101 sequentially discriminates positional information of the moving range of the retrieval icon on the screen (hereinafter, referred to as "positional information of moving range") according to device information of a monitor or a display or information representing a displayable area of an application; and hands the discriminated positional information of the moving range over to the display control unit 105. The positional information refers to information representing an X coordinate and a Y coordinate on the screen.

The display control unit 105 compares the positional information of the moving range acquired from the input control unit 101 with positional information of the plotted image data on the screen (hereinafter, referred to as "positional information of image data"), and extracts image data that overlaps the positional information of the moving range. Here, meaning of overlapping includes not only the case in which the positional information of the moving range matches with the positional information of the image data but also the case in which a difference between the positional information of the moving range and the positional information of the image data is within a predetermined threshold value which has been previously set.

The display control unit 105 displays the image icons or the thumbnails associated with the extracted image near the retrieval icon.

Further, the display control unit 105 does not display image data which is not included in the moving range even in the case of the image icon or the thumbnail plotted on the screen.

Further, the display control unit 105 may increase or decrease the amount of extracted image data depending on the moving speed of the retrieval icon. For example, when the moving speed of the retrieval icon received by the input control unit 101 is fast, the display control unit 105 displays image data which is smaller in amount than a predetermined amount; whereas when the moving speed of the retrieval icon is slow, the display control unit 105 displays image data which is larger in amount than a predetermined amount.

Specifically, the input control unit 101 calculates a series of moving speeds of the retrieval icon in a predetermined section (for example, from the right to the left, from the left to the right, from the top to the bottom, or from the bottom to the top). When the moving speed is faster than a certain value, since it is judged that the user desires a simple retrieval or a retrieval of a level closer to his/her desire, for example, considered is a method of extracting and displaying a target within a range which is higher in coincidence degree of the retrieval condition than a predetermined value or a target which satisfies (AND) all of retrieval conditions. Similarly, when the moving speed is slower than a certain value, since it is judged that the user desires a retrieval of a level wider than a desired range, for example, considered is a method of extracting and displaying a target including a range which is low in coincidence level of the retrieval condition to some extent or a target which satisfies (OR) part of the retrieval condition. The display control unit 105 may classify the moving speed in a stepwise fashion like "slow," "normal," and "fast" from a calculation result by the input control unit 101 and display the amount of image data decided according to the classified moving speed near the retrieval icon.

Figure 6:
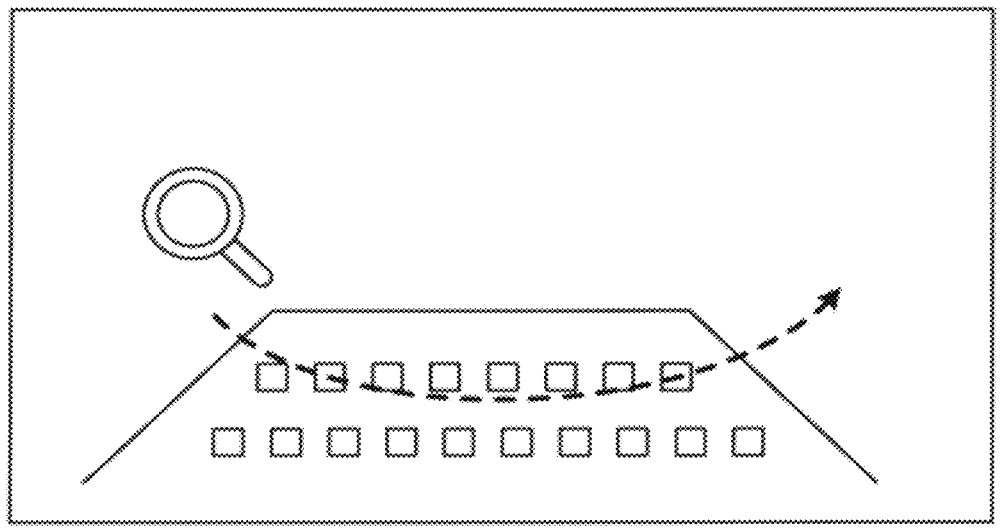
FIG. 6 is a diagram illustrating an example of an entire image displayed by a display control unit.
Figure 7:
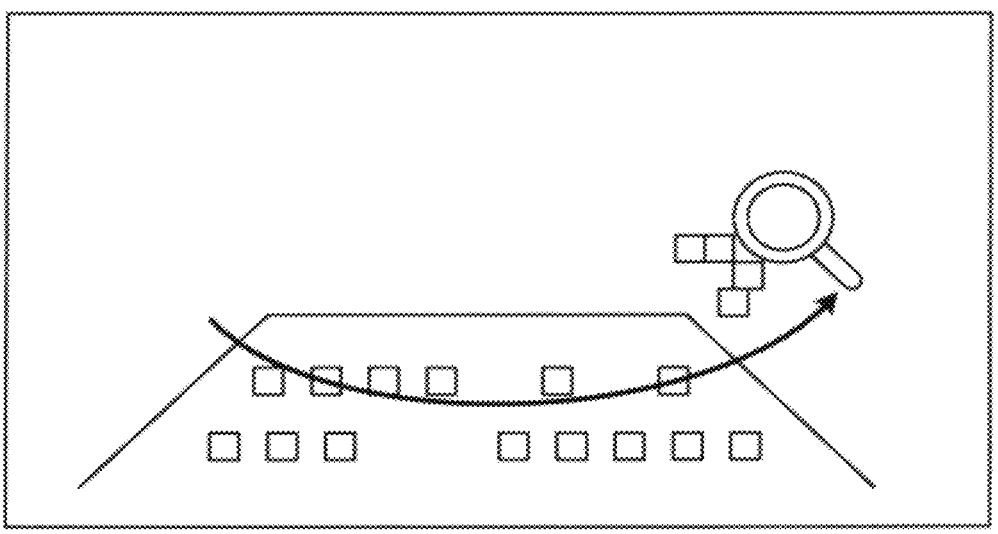
FIG. 7 is a diagram illustrating an example of an entire image displayed by a display control unit.

FIGS. 6 and 7 are diagrams illustrating an example of the entire image displayed by the display control unit 105. In FIGS. 6 and 7, "□s" which are lined up are image icons; and a line surrounding all image icons represents the entire image. As data in which image data displayed on the entire image as the retrieval result is reduced, a thumbnail as well as the image icon may be used.

An icon designated as a magnifying glass illustrated in FIGS. 6 and 7 represents the retrieval icon, moved by the user, for designating display of the retrieval result. FIG. 6 represents a state before the retrieval icon moves; and a dotted line represents the locus of the retrieval icon which is to move from now. FIG. 7 represents a state after the retrieval icon has moved; and a solid line represents the locus of the moved retrieval icon. Further, in FIG. 7, the display control unit 105 displays image data specified by image icons which have been traced to the lower left of the retrieval icon by movement of the retrieval icon.

Figure 8:
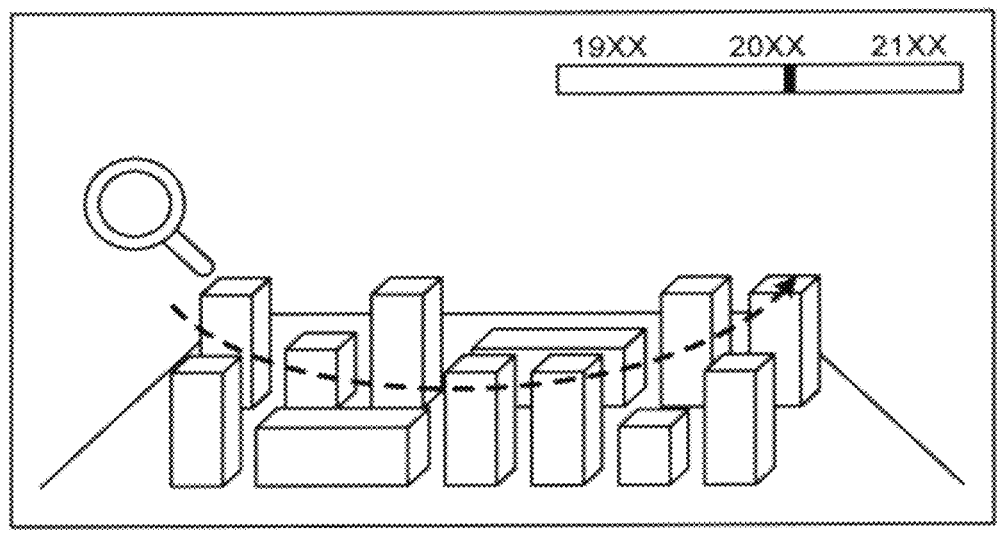
FIG. 8 is a diagram illustrating another example of an entire image displayed by a display control unit.
Figure 9:
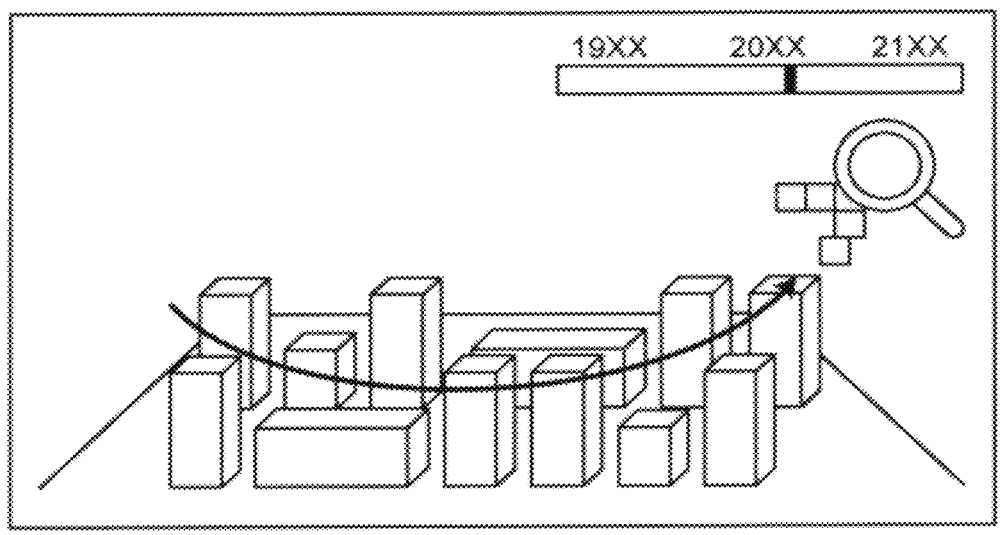
FIG. 9 is a diagram illustrating another example of an entire image displayed by a display control unit.

FIGS. 8 and 9 are diagrams illustrating another example of the entire image displayed by the display control unit 105. Referring to FIGS. 8 and 9, the display control unit 105 stereoscopically displays the entire image. In FIGS. 8 and 9, a bar illustrated at the upper right represents a year in which image data has been acquired. In FIGS. 8 and 9, image data acquired in "year of 20XX" is displayed.

Even in FIGS. 8 and 9, similarly to FIGS. 6 and 7, the retrieval icon is an icon moved by the user for designating display of the retrieval result. FIG. 8 represents a state before the retrieval icon moves; and a dotted line represents the locus of the retrieval icon which is to move from now. FIG. 9 represents a state after the retrieval icon has moved; and a solid line represents the locus of the moved retrieval icon. Further, in FIG. 9, the display control unit 105 displays image data of stereoscopic images which have been traced to the lower left of the retrieval icon.

Figure 10:
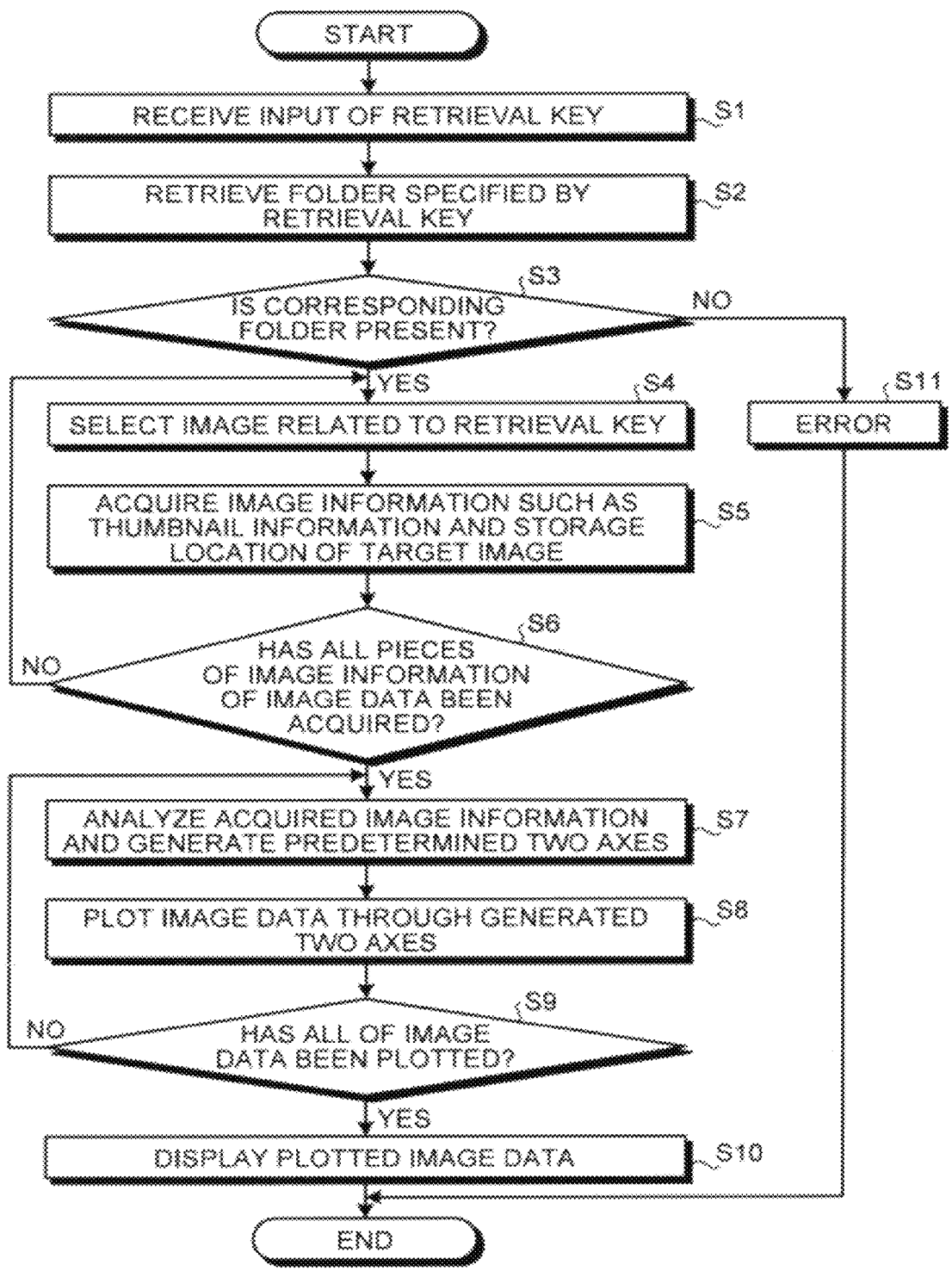
FIG. 10 is a flowchart illustrating a procedure of a retrieval process by a file server.

Next, a description will be made in connection with a retrieval process by the file server 100 configured in the above described manner. FIG. 10 is a flowchart illustrating a procedure of the retrieval process by the file server 100. Before the retrieval process starts, the file server 100 performs user authentication. For example, the input control unit 101 receives a user ID and a password from the PC 200*a* and compares them with information registered in the user information management table 121.

Figure 11:
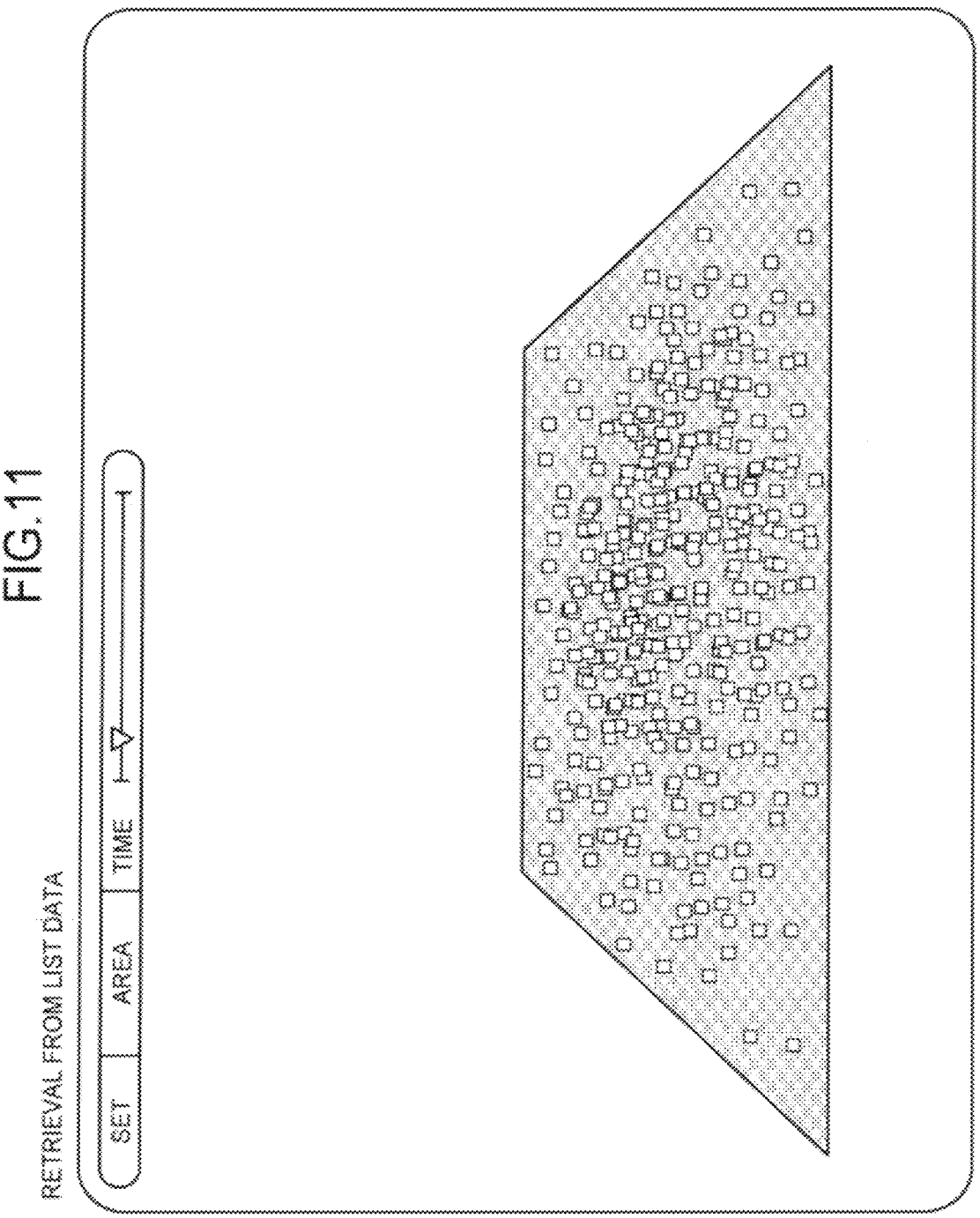
FIG. 11 is a diagram illustrating an example of a retrieval screen by a list of image data.

In step S1, the input control unit 101 receives an input of a retrieval key as a retrieval condition. FIG. 11 is a diagram illustrating an example of a retrieval screen by a list of image data. As illustrated in FIG. 11, on the upper left of the retrieval screen, arranged are icons of "SET," "AREA," and "TIME." Here, "SET" represents an icon for displaying an input screen of the retrieval key; "AREA" represents an icon for displaying an input screen of a region where image data has been acquired; and "TIME" represents an icon for displaying an input screen of timing at which image data has been acquired.

Figure 12:
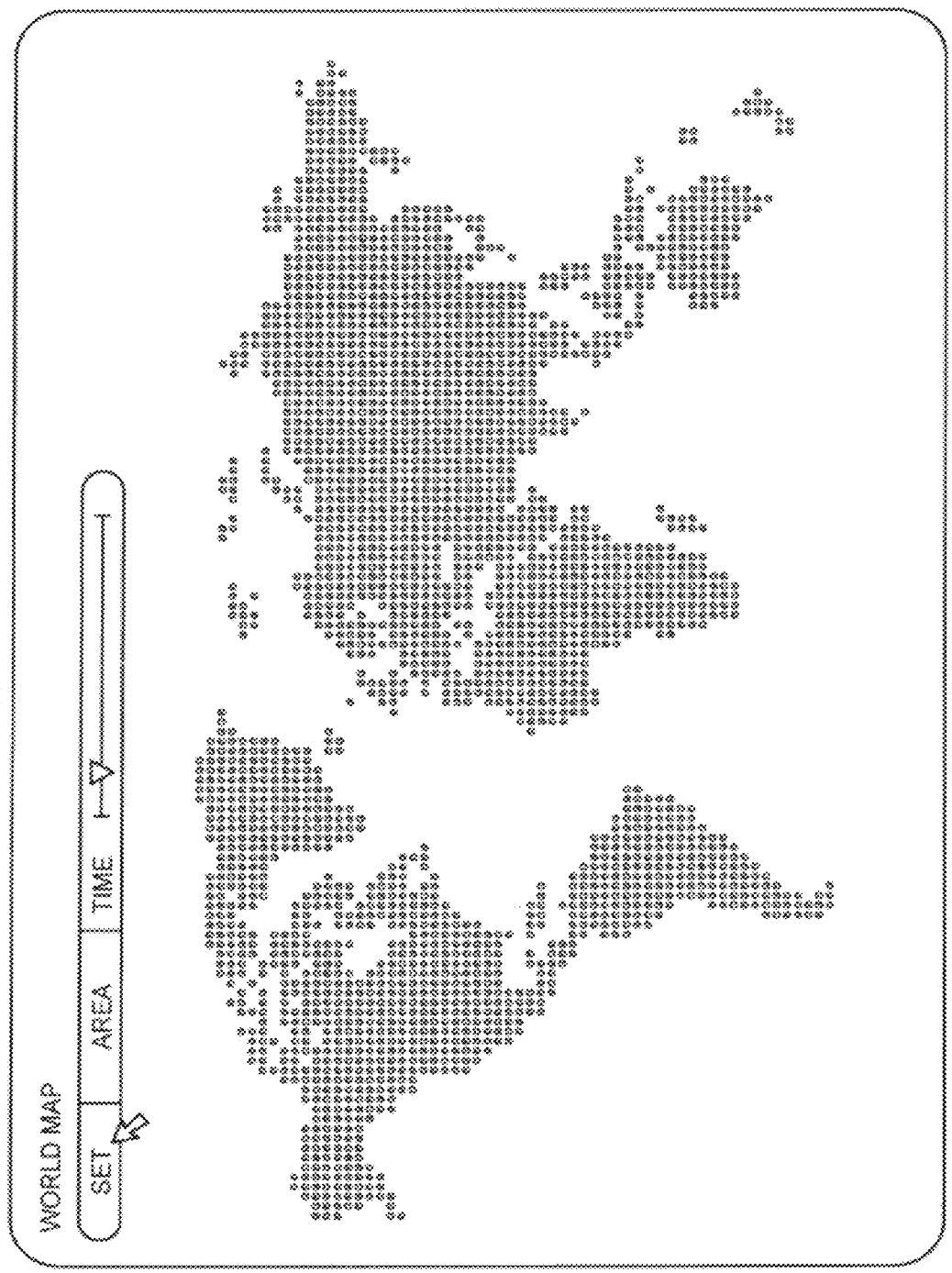
FIG. 12 is a diagram illustrating an example of a retrieval screen of image data with positional information.

FIG. 12 is a diagram illustrating an example of the retrieval screen of image data with positional information. As illustrated in FIG. 12, the display control unit 105 displays the world map as the entire image. Even in FIG. 12, similarly to FIG. 11, icons of "SET," "AREA," and "TIME" are arranged on the upper left of the retrieval screen. In FIG. 12, an arrow icon is pointed on the icon of "SET." The input control unit 101 receives an input of "SET" when the user presses a mouse button down.

Figure 13:
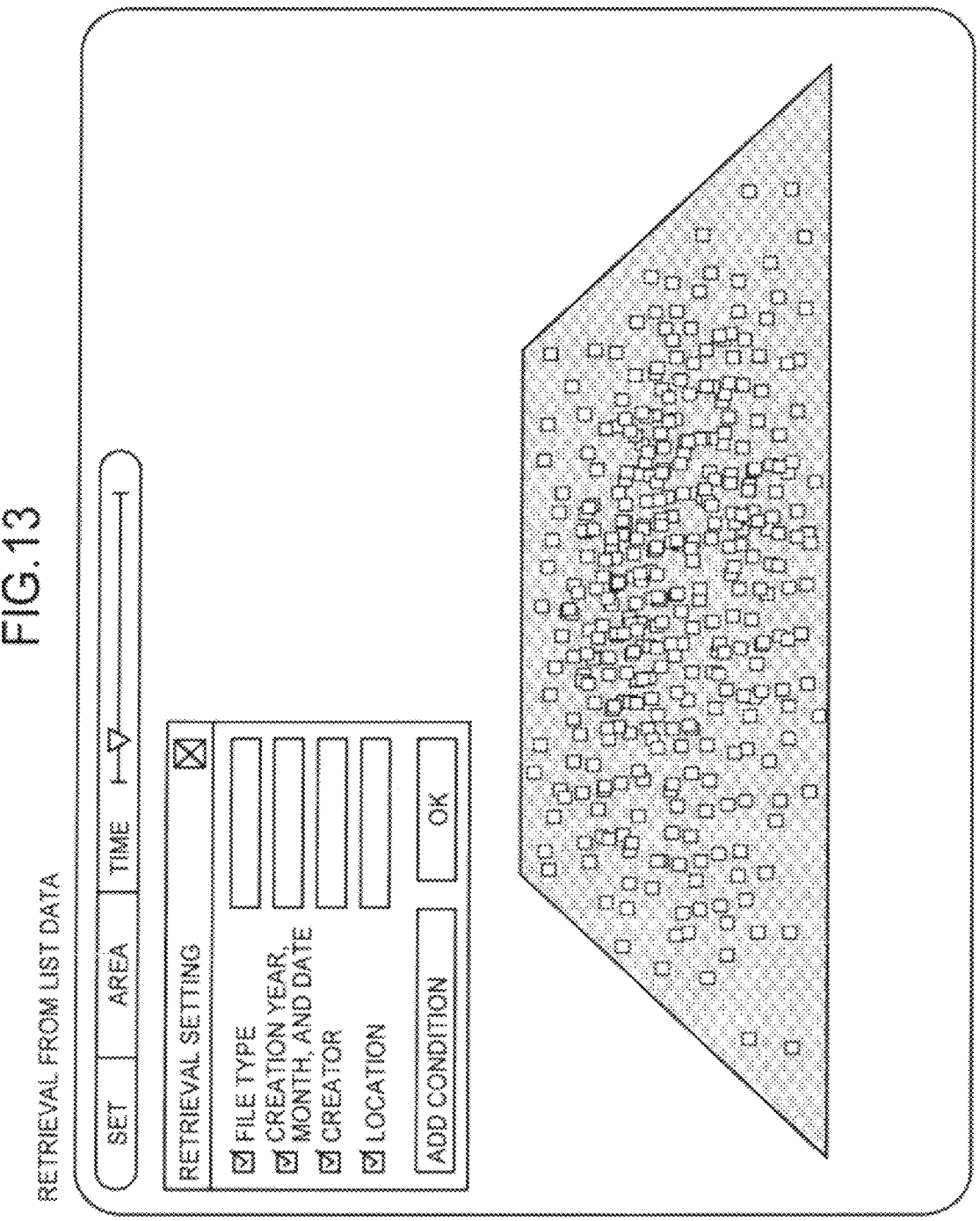
FIG. 13 is a diagram illustrating an example of a retrieval setting screen.

FIG. 13 is a diagram illustrating an example of a retrieval setting screen. As illustrated in FIG. 13, the display control unit 105 displays the retrieval setting screen on the screen when the icon of "SET" is pressed down. In FIG. 13, the display control unit 105 displays the retrieval setting screen so that items of "file type," "creation year, month, and date," "creator," and "location" can be input.

Further, in a lower portion of the retrieval setting screen, arranged are icons of "add condition" and "OK." The icon of "add condition" represents an icon for displaying an input screen of a condition to be added to the items. For example, the input control unit 101 can receive an input of other additional information such as the number of pixels, the image quality, shooting date and time, the price of image, the amount of data, and a coupon as a condition to add.

The icon of "OK" represents an icon for instructing the retrieval start using the input retrieval key. The input control unit 101 receives an input of the retrieval key input to the items from the user. After receiving the input of the retrieval key, when an icon represented by a mark "x" on the upper right is pressed down, the input control unit 101 receives a close instruction of the retrieval setting screen.

Figure 14:
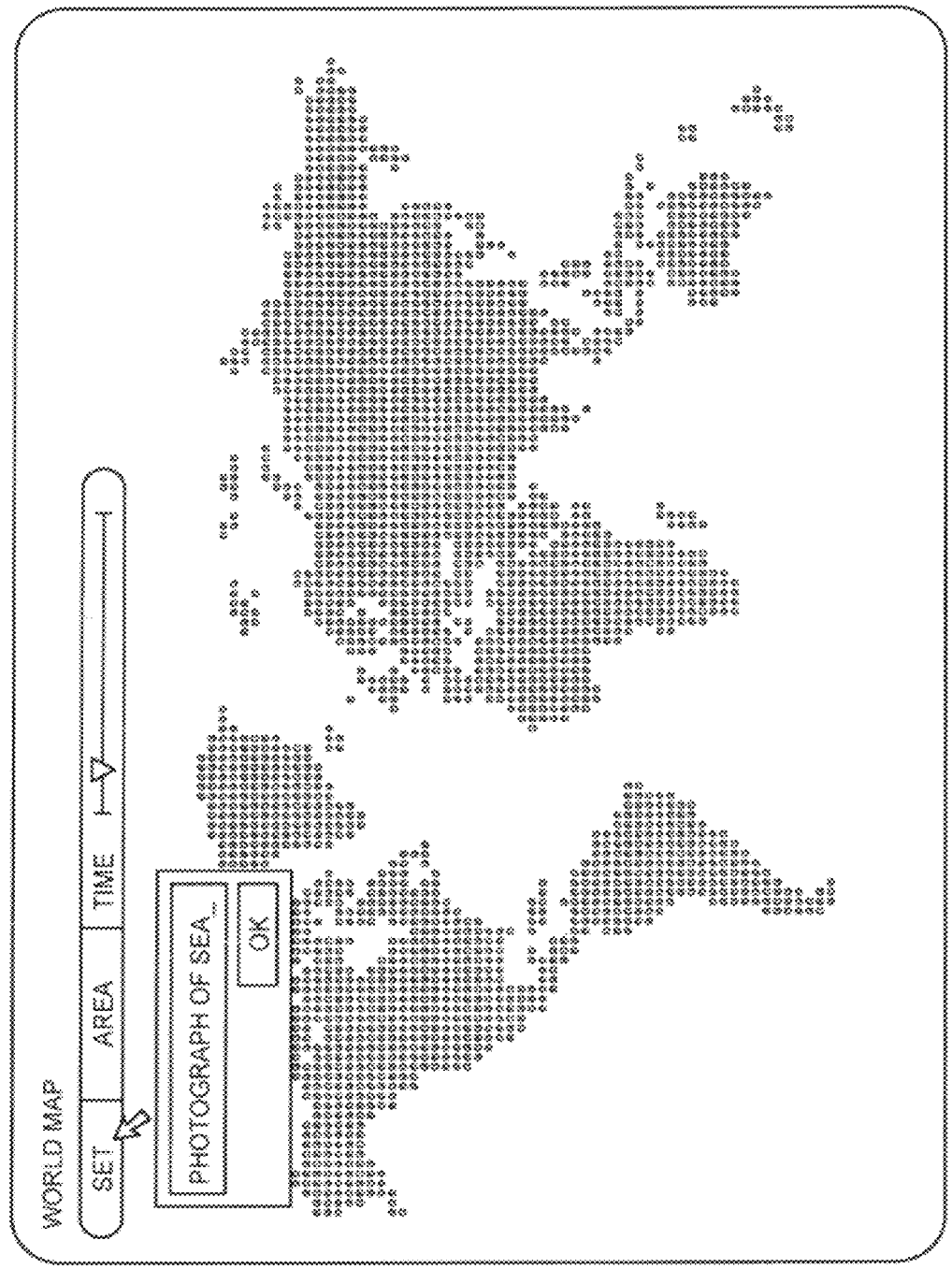
FIG. 14 is a diagram illustrating an example of a retrieval key input to a retrieval setting screen.

FIG. 14 is a diagram illustrating an example of a retrieval key input to the retrieval setting screen. As illustrated in FIG. 14, the input control unit 101 receives an input of a retrieval key "photograph of sea" through the retrieval setting screen.

In step S2, the retrieval unit 103 retrieves a folder specified by the input retrieval key. Here, retrieved is a folder that stores image data including a word of "photograph of sea" as image information or image data related to a keyword of "photograph of sea."

In step S3, the retrieval unit 103 judges whether or not a corresponding folder is present. When it is judged that the corresponding folder is present (Yes in step S3), in step S4, the retrieval unit 103 selects image data related to the retrieval key from the corresponding folder. However, when it is judged that the corresponding folder is not present (No in step S3), in step S11, the retrieval unit 103 displays an error. Here, the display control unit 105 may display a message representing that the corresponding folder is not present or a message urging changing of the retrieval key.

In step S5, the retrieval unit 103 acquires image information such as thumbnail information or storage location of the selected image data. In step S6, the retrieval unit 103 judges whether or not all pieces of image information of the image data which is the retrieval target has been acquired. When the retrieval unit 103 judges that all pieces of image information of the image data which is the retrieval target has been acquired (Yes in step S6), in step S7, the generating unit 106 analyzes the acquired image information of the image data and generates predetermined two axes. For example, the generating unit 106 specifies an item in which image data can be displayed in a distributed form among all pieces of acquired image information of the image data as an axis and generates an axis representing a predetermined value interval at which all image data can be distributed.

In step S8, the generating unit 106 plots the acquired image data on the generation two axes. For example, the generating unit 106 plots the image icon or the thumbnail on the generated two axes. In step S9, the generating unit 106 judges whether or not all of image data has been plotted. When it is judged that all of image data has been plotted (Yes in step S9), in step S10, the display control unit 105 displays the plotted image data on the operation display unit of the client 200.

However, when it is judged in step S9 that not all of image data has been plotted (No in step S9), the generating unit 106 returns to step S7; and processing of step S7 step S8 is repeated.

Figure 15:
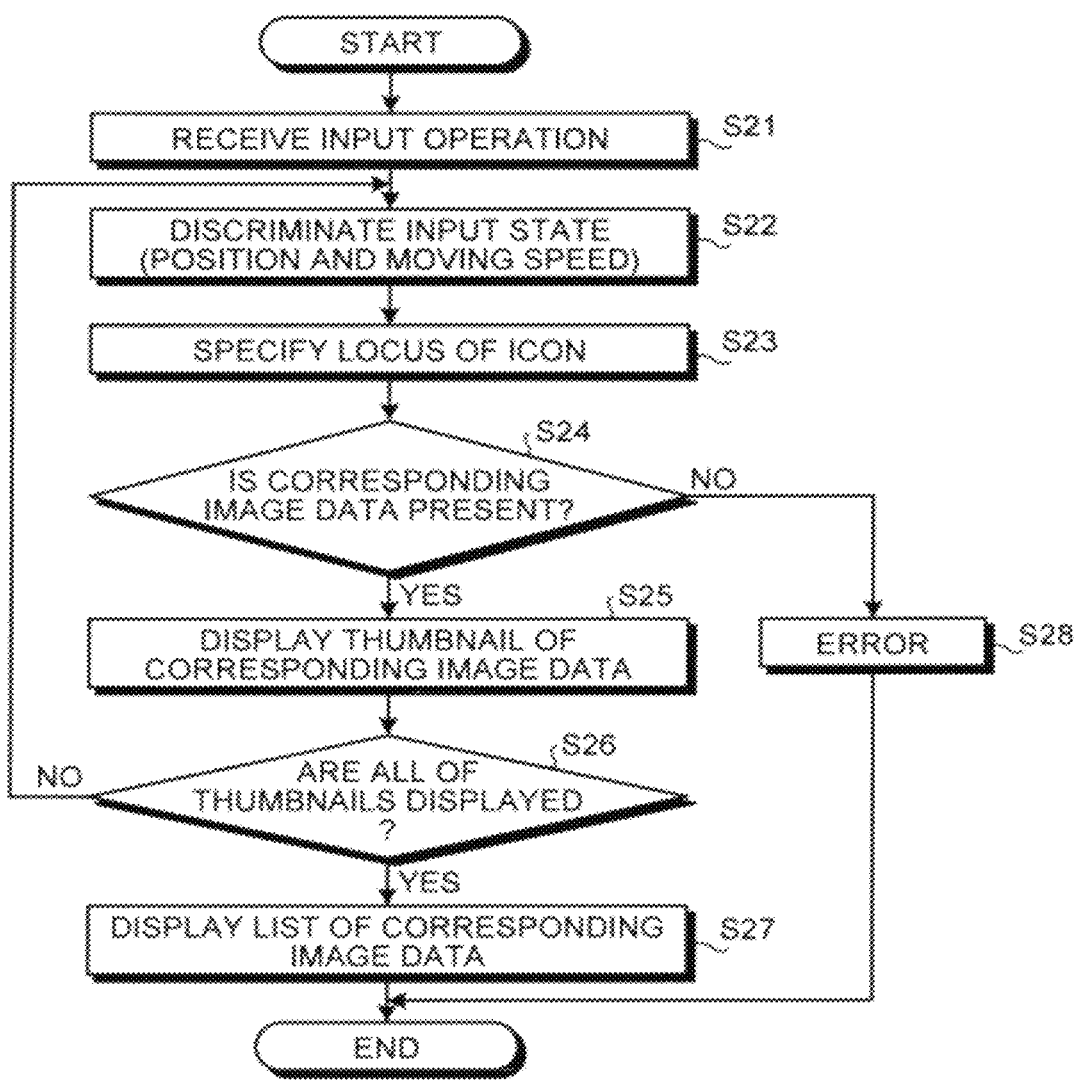
FIG. 15 is a flowchart illustrating a procedure of a retrieval result display process by a file server.

Next, a description will be made in connection with a procedure of a retrieval result display process by the file server 100. FIG. 15 is a flowchart illustrating the procedure of the retrieval result display process by the file server 100.

Figure 16:
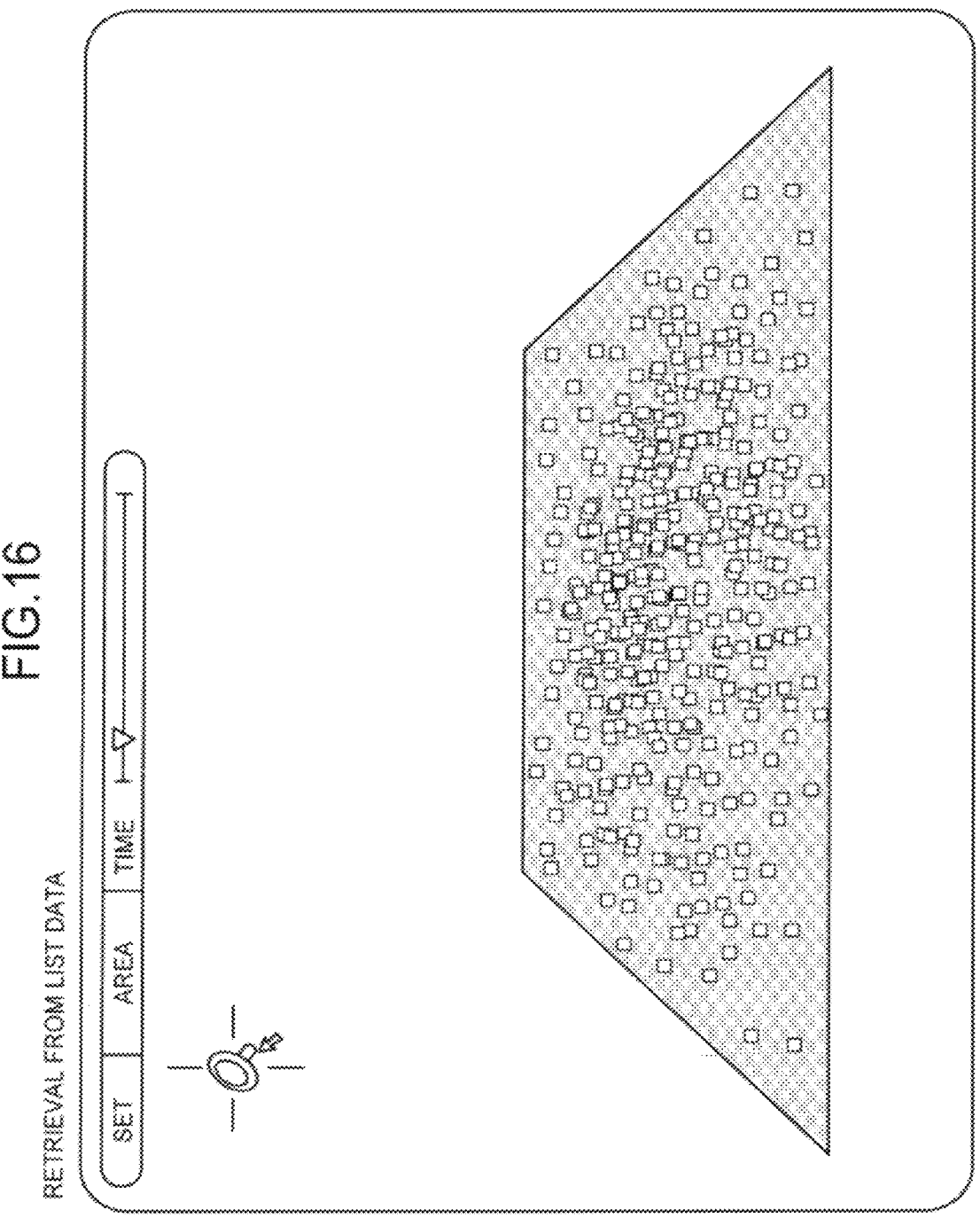
FIG. 16 is a diagram illustrating an example of a retrieval icon which is an operation target by a mouse.
Figure 17:
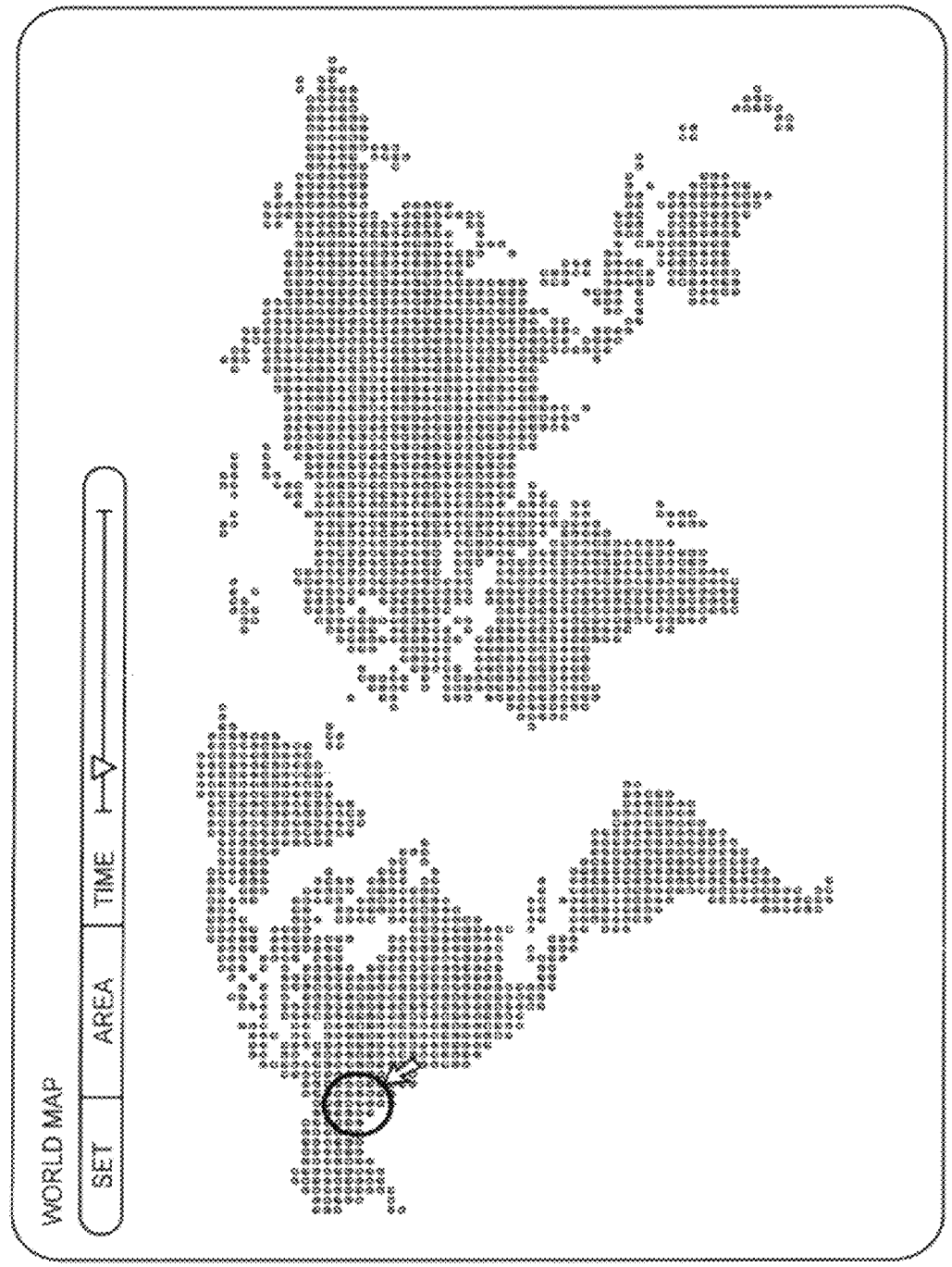
FIG. 17 is a diagram illustrating an example of a retrieval icon which is an operation target by a mouse.

In step S21, the input control unit 101 receives an input operation by a mouse. FIGS. 16 and 17 are diagrams illustrating an example of a retrieval icon which is an operation target by a mouse. In FIG. 16, the display control unit 105 displays a retrieval icon designated in the form of a magnifying glass on the upper left of the retrieval screen by a list of image data. In the retrieval screen of image data with positional information illustrated in FIG. 17, the display control unit 105 displays a retrieval icon of "O" with an arrow on the upper left of the retrieval screen. For example, when an axis generated by the generating unit 106 is generated based on GPS information, the display control unit 105 displays image data including GPS information in association with the position represented by the axis. Further, when an axis generated by the generating unit 106 is shooting timing, the display control unit 105 displays image data including shooting date and time in association with the position represented by the date of the axis.

In step S22, the input control unit 101 discriminates the input state such as the position of the mouse on the screen, the moving speed, and the like. For example, the input control unit 101 discriminates left click pressing of the mouse from an input of the start point of the moving range.

In step S23, the display control unit 105 specifies the locus of the retrieval icon based on the input state of the mouse discriminated by the input control unit 101. For example, the display control unit 105 specifies the moving range of the retrieval icon based on an operation of pressing down the left click of the mouse discriminated by the input control unit 101. Further, the display control unit 105 specifies the axial position associated with the axis based on the moving range of the retrieval icon and extracts image data included in the specified axial position.

Figure 18:
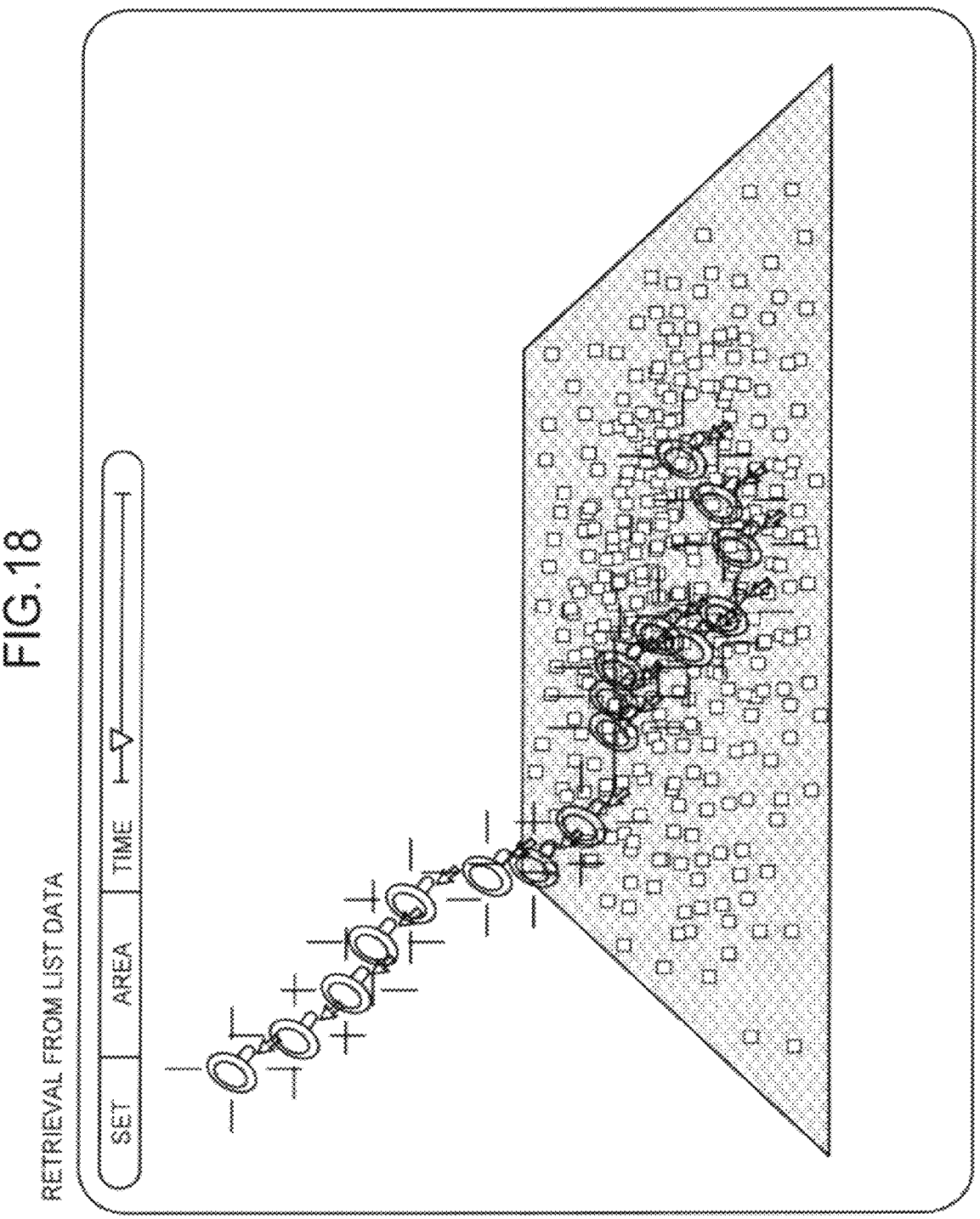
FIG. 18 is a diagram illustrating an example of a moving range of a retrieval icon on a screen.
Figure 19:
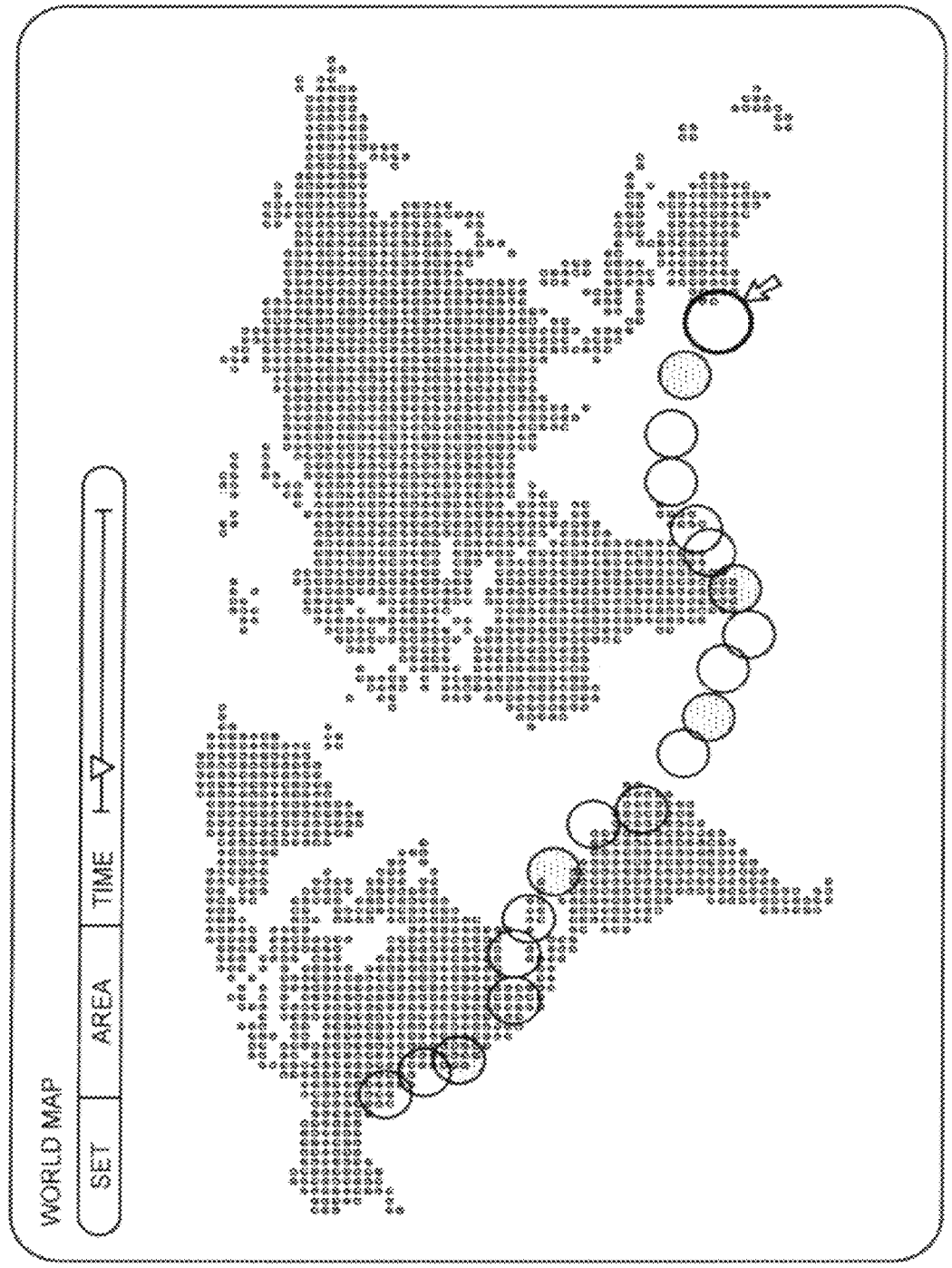
FIG. 19 is a diagram illustrating an example of a moving range of a retrieval icon on a screen.

FIGS. 18 and 19 illustrate an example of the moving range of the retrieval icon on the screen. FIG. 18 illustrate the locus in which the retrieval icon has started from the upper left of the screen and moved to the lower right of the screen in the retrieval screen by a list of image data. Similarly, FIG. 19 illustrates the locus in which the retrieval icon has started from the upper left of the screen and moved to the lower right of the screen in the retrieval screen of image data with positional information.

In step S24, the display control unit 105 judges whether or not there is image data corresponding to the positional information of the specified moving range of the retrieval icon (hereinafter, referred to as "corresponding image data") based on the retrieval result by the retrieval unit 103. For example, the display control unit 105 compares the positional information of the moving range with the positional information of the image icon and judges whether or not there is image data overlapping the positional information of the moving range. When it is judged that there is image data overlapping the positional information of the moving range, the display control unit 105 extracts an image icon or a thumbnail associated with the axis of the corresponding image data.

When it is judged that there is corresponding image data (Yes in step S24), in step S25, the display control unit 105 displays the thumbnail of the corresponding image data near the retrieval icon. For example, the display control unit 105 displays the extracted image icon or thumbnail near the retrieval icon.

Figure 20:
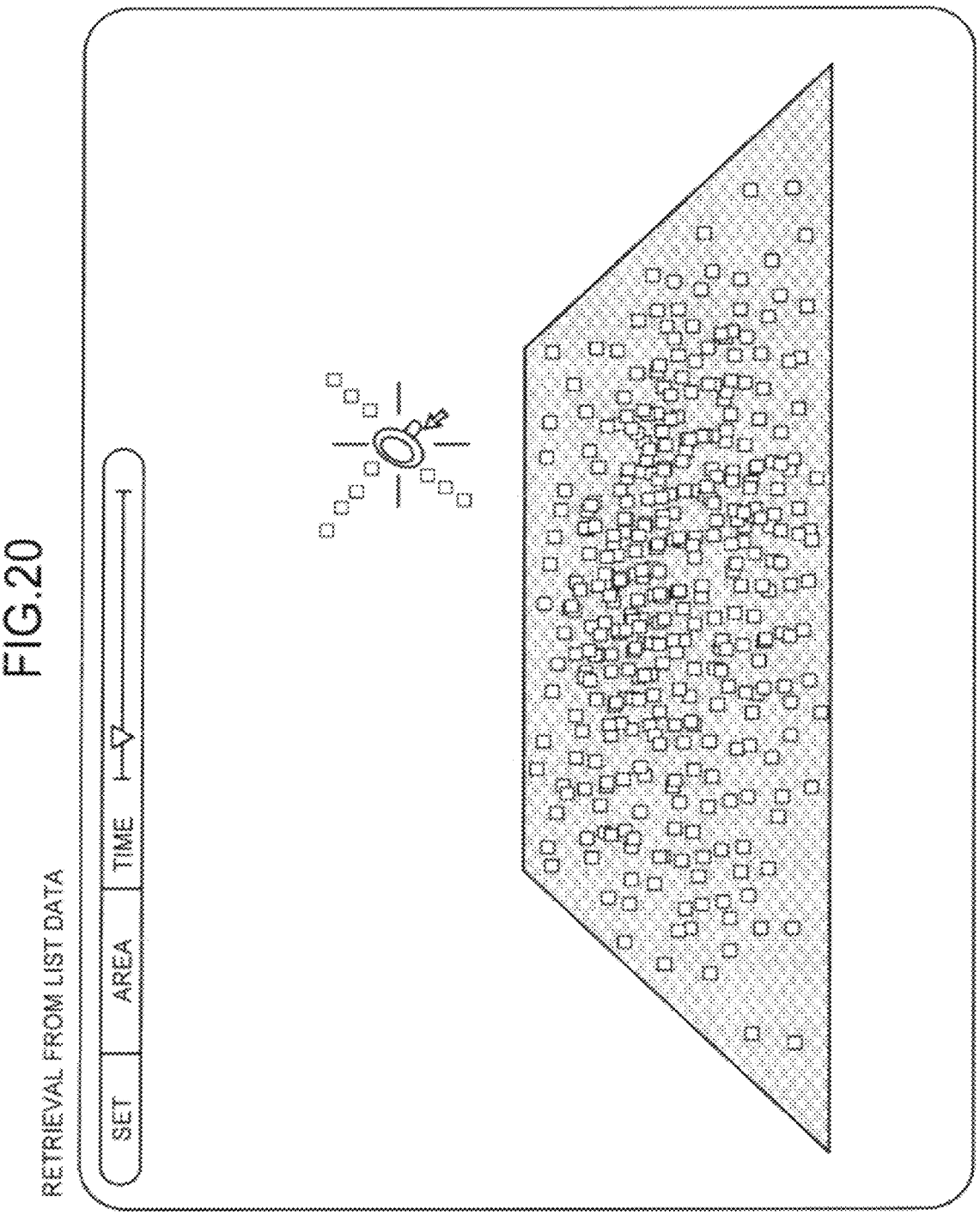
FIG. 20 is a diagram illustrating an example of a display state of a thumbnail of image data displayed near a retrieval icon.

FIG. 20 is a diagram illustrating an example of a display state of the thumbnails of the image data displayed near the retrieval icon. In FIG. 20, a predetermined area centering on the retrieval icon is divided into four areas by a cross.

Here, the display control unit 105 may display not only image data corresponding to the retrieval icon but also image data corresponding to the neighborhood of the retrieval icon together. In this case, as illustrated in FIG. 20, the display control unit 105 displays image data corresponding to the neighborhood of the retrieval icon together, in northern, southern, eastern and western areas of the retrieval icon, according to positional (X-Y coordinates) information, on the screen on which individual image data has been plotted.

Alternatively, in the case in which predetermined image information (the capacity size, the size, shooting timing, the shooting season, a shooting location, or the like) has been allocated to a predetermined area centering on the retrieval icon illustrated in FIG. 20, the display control unit 105 may display image data on a corresponding area according to image information. In this case, the display control unit 105 may inclusively display a plurality of image data displayed on the same area as one group image.

For example, the display control unit 105 may display one representative image representing a group in the foreground and display the remaining image data in a form shifted to the back surface of the representative image. Specifically, let us assume that similar four image data of "blue sea" share common features of "a blue sea and a white sand beach are equally divided into the upper and the lower by a balance of a photograph." In this case, the display control unit 105 newly generates one piece of new representative image of "a blue sea and a white sand beach are equally divided into the upper and the lower by a balance of a photograph" based on color information and a degree of similarity and displays the representative image instead of four pieces of image data. Further, as another example, the display control unit 105 may display four pieces of image data, at a different size, near the newly generated representative image.

Meanwhile, when it is judged that the specified corresponding image data is not present (No in step S24), in step S28, the display control unit 105 displays an error. Here, the display control unit 105 may display a message representing that the corresponding folder is not present or a message urging changing of the retrieval key.

In step S26, the display control unit 105 judges whether or not all of the thumbnails of the corresponding image data have been displayed near the icon. When it is judged that all of the thumbnails of the corresponding image data have been displayed near the icon (Yes in step S26), in step S27, the display control unit 105 displays a list of corresponding image data on an empty space on the screen. Here, the display control unit 105 discriminates the empty space on the screen according to the amount of corresponding image data. Further, when the amount of corresponding image data is larger than the mount displayable on the empty space on the screen, the display control unit 105 may reduce the image data to the size displayable on the empty space and then displays the reduced image data.

Figure 21:
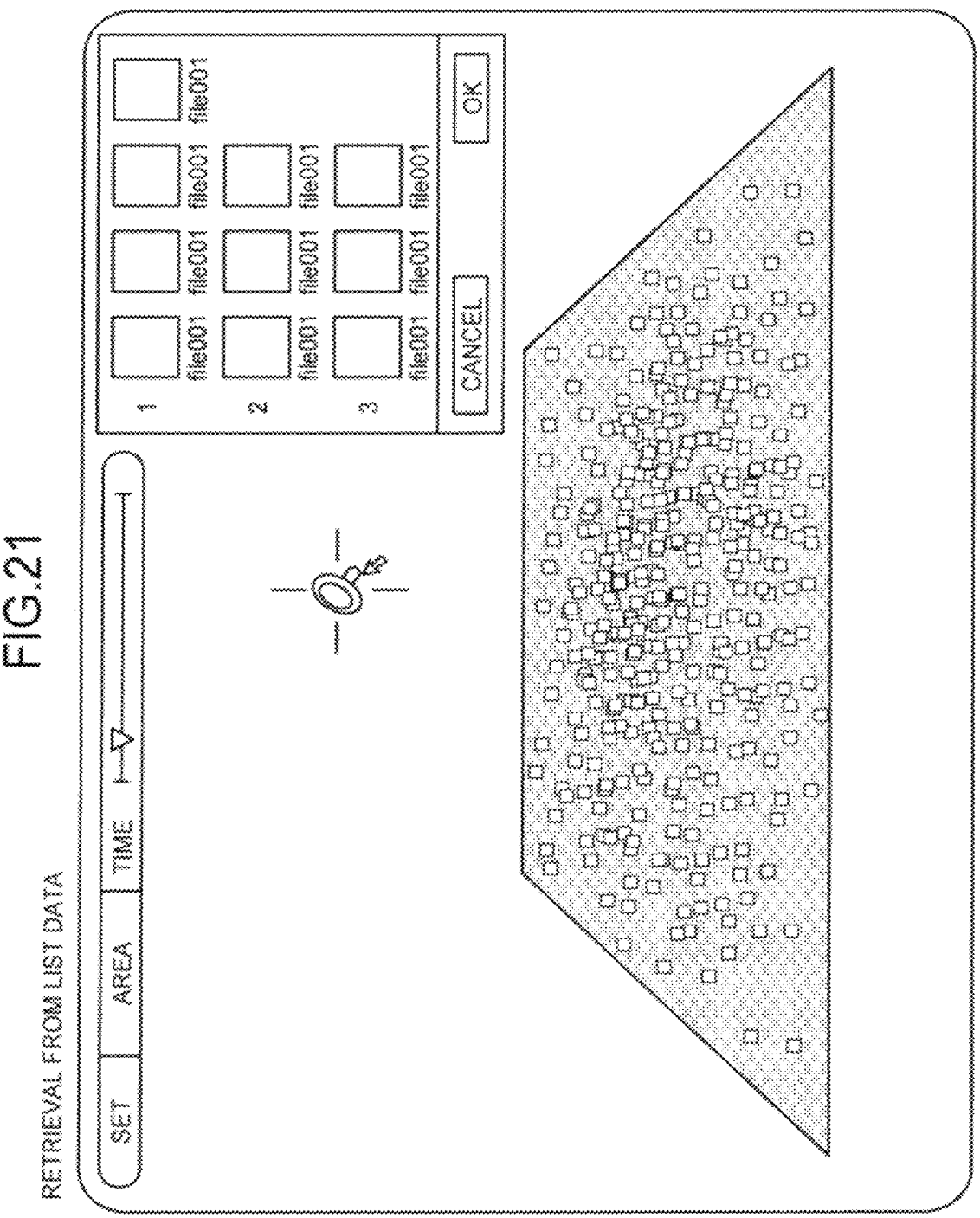
FIG. 21 is a diagram illustrating an example of a display state of image data corresponding to a moving range of a retrieval icon.
Figure 22:
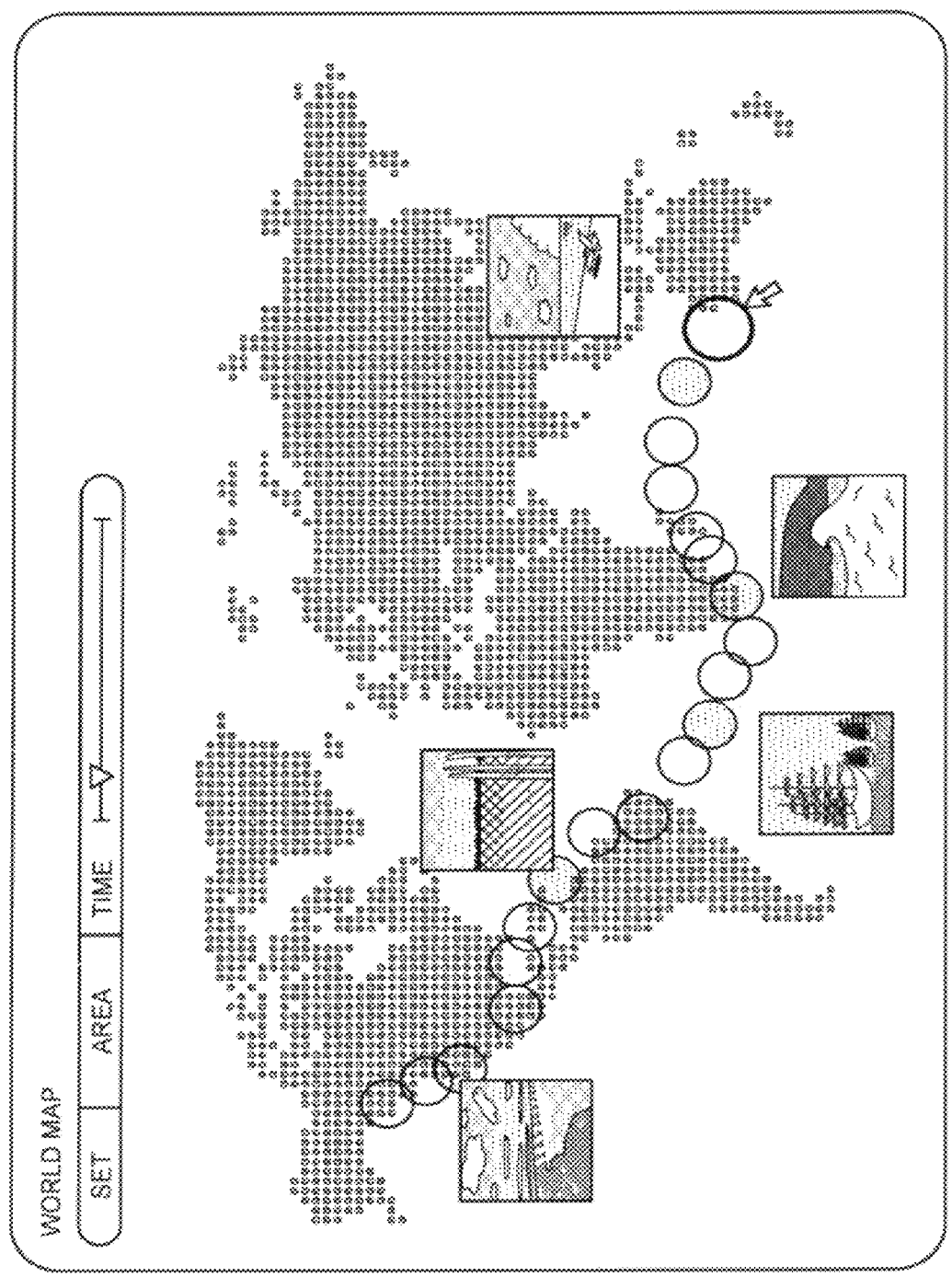
FIG. 22 is a diagram illustrating an example of a display state of image data corresponding to a moving range of a retrieval icon.

FIGS. 21 and 22 are diagrams illustrating an example of a display state of image data corresponding to the moving range of the retrieval icon. In the retrieval screen by a list of image data illustrated in FIG. 21, a widest empty space is present on the upper right of the screen. The display control unit 105 displays image data corresponding to the moving range of the retrieval icon on the upper right of the screen together. Further, in the retrieval screen representing the world map illustrated in FIG. 22, the display control unit 105 displays image data with GPS information corresponding to the position on the map on the empty space near the corresponding position.

Figure 23:
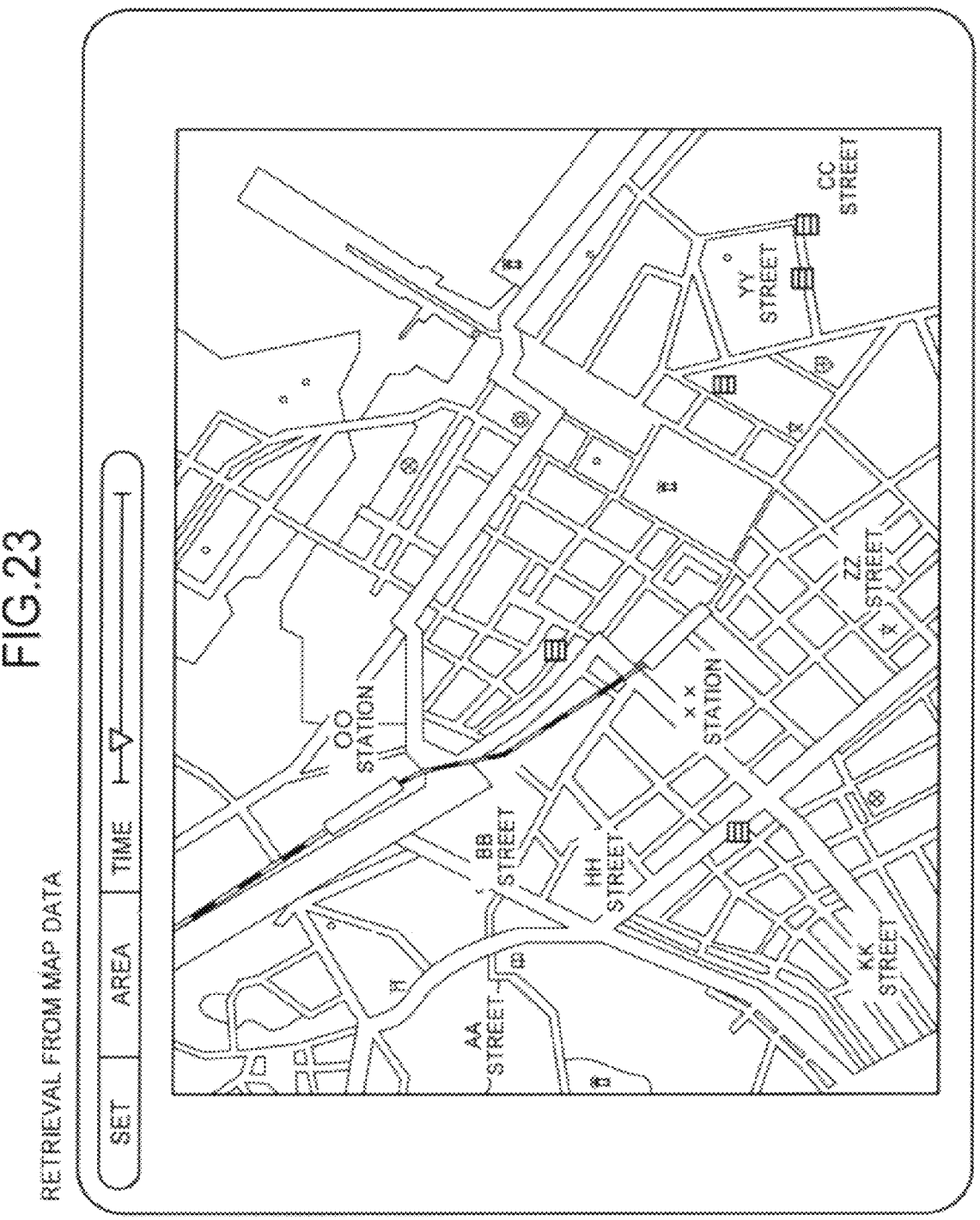
FIG. 23 is a diagram illustrating map data near a predetermined railroad station.

In the present embodiment, the retrieval screen representing the list of image data and the retrieval screen representing the world map have been described as the entire image; but the entire image is not limited thereto. For example, FIG. 23 is a diagram illustrating map data around a predetermined railroad station. As illustrated in FIG. 23, similarly, the display control unit 105 displays image data including GPS information in association with the position represented by the axis. The display control unit 105 displays map data around a predetermined railroad station as the entire image to be specifiable by the retrieval icon.

Figure 24:
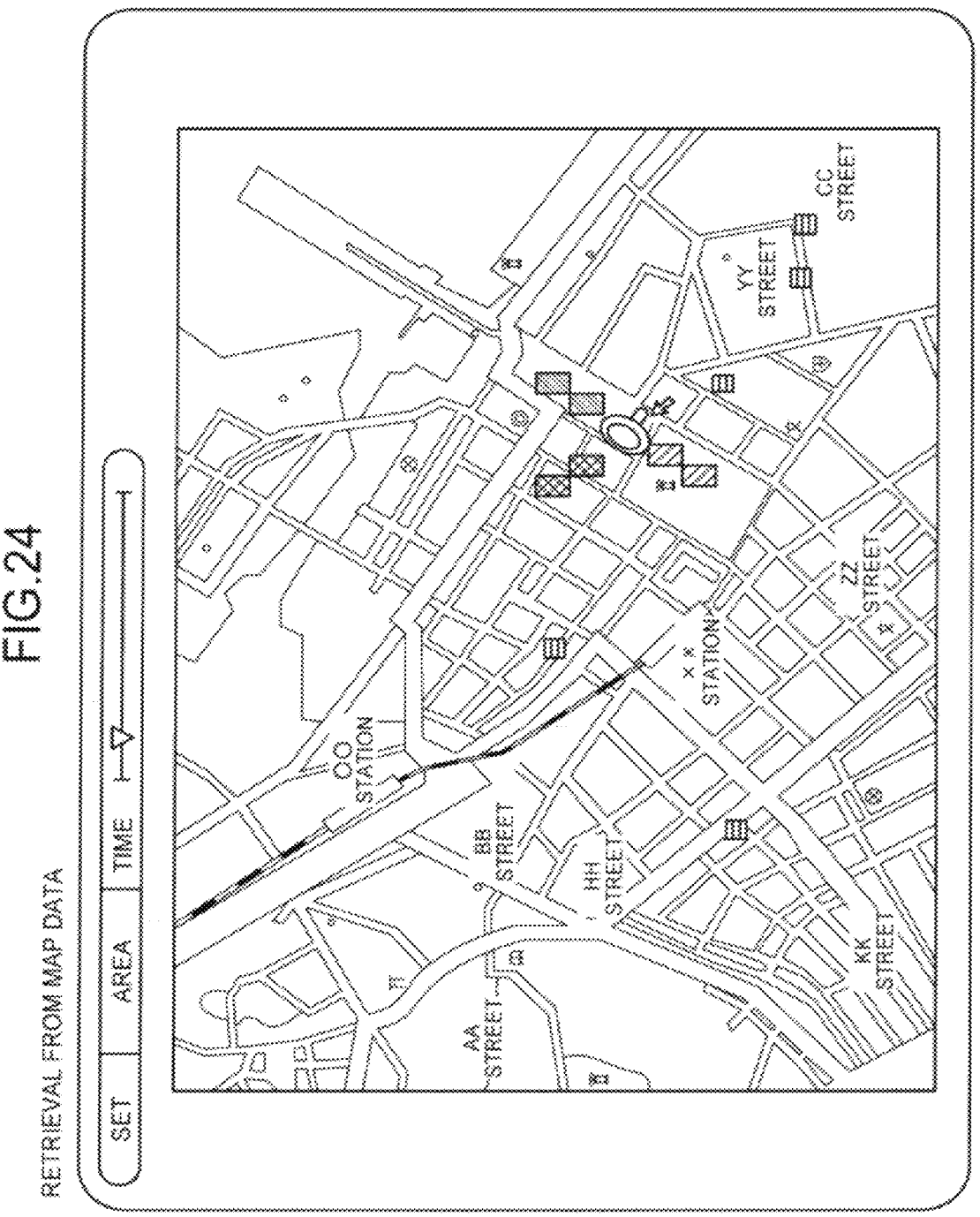
FIG. 24 is a diagram illustrating an example of image data displayed by a retrieval result display process.

FIG. 24 illustrates an example of a display state of image data displayed by a retrieval result display process according to the present embodiment. The display control unit 105 specifies image data included in the moving range of the retrieval icon and displays an image icon corresponding to GPS information of the specified image data. Here, when a restaurant is input as a retrieval condition, the display control unit 105 may display specified image data corresponding to GPS information according to a type of restaurant.

In FIG. 24, the display control unit 105 displays icons discriminable by different hatchings in three directions, centering on the retrieval icon. Here, the display control unit 105 may display icons discriminated by types of Japanese style dish, Chinese style dish, and western style dish.

As described above, according to the present embodiment, after the entire image is displayed such that image data of the retrieval result is displayed in a distributed form, an input of range which the user desires to display is received from the displayed entire image; and image data corresponding to the received range is displayed. Thus, it is possible to variably display a desired retrieval result while displaying an entire image of a category to which an image of the retrieval target belongs.

An information display device of the present embodiment includes a control device such as a central processing unit (CPU), a storage device such as a read only memory (ROM) or a random access memory (RAM), a HDD, an external storage device such as a compact disk (CD) drive, a display device, and an input device such as a keyboard or a mouse. That is, the information display device has a hardware configuration using a typical computer.

An information display program executed by the information display device according to the present embodiment may be a file having an installable format or an executable format and may be provided in a form recorded on a computer readable recording medium such as a compact disk read only memory (CD-ROM), a flexible disk (FD), a compact disk rewritable (CD-R), and a digital versatile disk (DVD).

An information display program executed by the information display device according to the present embodiment may be configured to be stored in a computer connected to a network such as the Internet and provided by downloading through the network. An information display program executed by the information display device according to the present embodiment may be configured to be provided or distributed through a network such as the Internet.

An information display program of the present embodiment may be configured to be provided in a form which is embedded in a ROM or the like in advance.

An information display program executed by the information display device according to the present embodiment may have a module configuration including the above described components (the input control unit, the HTTP communication unit, the retrieval unit, the management unit, the display control unit, and the generating unit). In actual hardware, by reading out and executing the information display program from the storage medium through a CPU (a processor), the above described components are loaded onto a main storage device, so that the input control unit, the HTTP communication unit, the retrieval unit, the management unit, the display control unit, and the generating unit are generated on the main storage device.

According to the present invention, a user can efficiently operate the retrieval work with improved visibility.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information display device that manages and displays image data on a client terminal connected through a network, comprising:
   a storage unit that stores the image data therein in association with information of the image data including multiple items;
   a retrieval condition receiving unit that receives an input of a retrieval condition;
   a retrieval unit that retrieves the image data from the storage unit according to the received retrieval condition;
   a display control unit that displays an entire image representing an entire range in which the retrieved image data is distributed according to the information of the image data on the client terminal;
   an operation receiving unit that receives an operation of an input unit by a user on a screen on which the entire image is displayed; and
   a generating unit that specifies multiple items for displaying the retrieved image data in a distributed form from the multiple items included in the information of the image data stored in the storage unit, judges, based on information of the retrieved image data, whether or not it is possible to distribute the retrieved image data on an axis based on each of the specified multiple items, and generates axes on which distribution is judged as possible,
   wherein
   the display control unit
      extracts the image data included in a range represented by a locus formed by an operation of the input unit from among a retrieval result by the retrieval unit, and
      displays the extracted image data on the client terminal together with the entire image, and, at that time, displays the retrieved image data at display areas on the screen based on the generated axes.

2. The information display device according to claim 1, wherein
   the display control unit specifies the range represented by the locus based on
      coordinates of the entire image on the screen, and
      an operation position by the input unit on the screen.

3. The information display device according to claim 1, wherein
   the display control unit displays an icon moving on the entire image by an operation of the input unit on the screen, and
   the operation receiving unit receives an operation that moves the icon by the input unit.

4. The information display device according to claim 3, wherein
   the display control unit changes a size of the icon according to the retrieval result by the retrieval unit.

5. The information display device according to claim 3, wherein
   the display control unit displays the retrieval result by the retrieval unit near the icon.

6. The information display device according to claim 1, wherein
   the display control unit sequentially displays the retrieval result in response to an operation by the input unit.

7. An information display system, comprising:
   a client terminal; and
   an information display device that manages and displays image data on the client terminal,
   wherein the information display device includes
   a storage unit that stores the image data therein in association with information of the image data including multiple items,
   a retrieval condition receiving unit that receives an input of a retrieval condition,
   a retrieval unit that retrieves the image data from the storage unit according to the received retrieval condition,
   a display control unit that transmits an entire image, representing an entire range in which the retrieved image data is distributed according to the information of the image data to be displayed on the client terminal, to the client terminal,
   an operation receiving unit that receives an operation of an input unit of the client terminal by a user on a screen on which the entire image is displayed, and
   a generating unit that specifies multiple items for displaying the retrieved image data in a distributed form from the multiple items included in the information of the image data stored in the storage unit, judges, based on information of the retrieved image data, whether or not it is possible to distribute the retrieved image data on an axis based on each of the specified multiple items, and generates axes on which distribution is judged as possible,
   wherein the display control unit
      extracts the image data included in a range represented by a locus that is formed by an operation of the input unit from among a retrieval result by the retrieval unit,
      transmits the extracted image data to the client terminal, and
      makes the extracted image data display on the client terminal together with the entire image, and, at that time, makes the retrieved image data display at display areas on the screen based on the generated axes, and
   wherein the client terminal includes
      a communication unit that
         transmits the retrieval condition to the information display device, and
         receives the entire image and the extracted image data from the information display device, and
      a display unit that displays the extracted image data together with the entire image.

8. A computer program product comprising a non-transitory computer-usable medium having computer-readable program codes embodied in the medium for displaying image data on a client terminal, the program codes when executed causing a computer to execute:

storing an image data in a storage unit in association with information of the image data including multiple items;

first receiving that includes receiving an input of a retrieval condition;

retrieving the image data from the storage unit according to the received retrieval condition;

displaying an entire image representing an entire range in which the retrieved image data is distributed according to the information of the image data on the client terminal;

second receiving that includes receiving an operation of an input unit by a user on a screen on which the entire image is displayed; and specifying multiple items for displaying the retrieved image data in a distributed form from the multiple items included in the information of the image data stored in the storage unit, judging, based on information of the retrieved image data, whether or not it is possible to distribute the retrieved image data on an axis based on each of the specified multiple items, and generating axes on which distribution is judged as possible, wherein the displaying of the entire image includes extracting the image data included in a range represented by a locus formed by an operation of the input unit from among a retrieval result by the retrieving, and displaying the extracted image data on a client terminal together with the entire image, and, at that time, displaying the retrieved image data at display areas on the screen based on the generated axes.

* * * * *